United States Patent
Masuda et al.

(10) Patent No.: US 9,217,092 B2
(45) Date of Patent: Dec. 22, 2015

(54) INKJET RECORDING METHOD, INKJET RECORDING DEVICE, AND INK RECORDED MATTER

(71) Applicants: Kiminori Masuda, Tokyo (JP); Mariko Kojima, Tokyo (JP); Tsutomu Maekawa, Kanagawa (JP); Akiko Bannai, Kanagawa (JP); Takashi Tamai, Kanagawa (JP)

(72) Inventors: Kiminori Masuda, Tokyo (JP); Mariko Kojima, Tokyo (JP); Tsutomu Maekawa, Kanagawa (JP); Akiko Bannai, Kanagawa (JP); Takashi Tamai, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 339 days.

(21) Appl. No.: 13/894,635

(22) Filed: May 15, 2013

(65) Prior Publication Data

US 2013/0307912 A1 Nov. 21, 2013

(30) Foreign Application Priority Data

May 16, 2012 (JP) .................. 2012-112641
May 8, 2013 (JP) .................. 2013-098081

(51) Int. Cl.
*B41J 2/01* (2006.01)
*C09D 11/38* (2014.01)
(Continued)

(52) U.S. Cl.
CPC ............. *C09D 11/38* (2013.01); *C09D 11/322* (2013.01); *C09D 11/40* (2013.01); *B41J 2/2107* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ........... 347/100, 95, 96, 101, 102, 88, 99, 21, 347/20, 9; 106/31.6, 31.27; 523/160, 161
See application file for complete search history.

(56) References Cited

U.S. PATENT DOCUMENTS 5,514,208 A 5/1996 Nagai et al.
5,622,550 A 4/1997 Konishi et al.
(Continued)

FOREIGN PATENT DOCUMENTS

JP 2001-219680 8/2001
JP 2003-231838 8/2003
(Continued)

OTHER PUBLICATIONS

U.S. Appl. No. 08/638,636, filed Apr. 26, 1996.
(Continued)

*Primary Examiner* — Manish S Shah
(74) *Attorney, Agent, or Firm* — Oblon, McClelland, Maier & Neustadt, L.L.P.

(57) ABSTRACT

An inkjet recording method, containing: applying a stimulus to an inkjet recording ink to jet the ink, to form an image on a recording medium, wherein the ink contains water, a water-soluble organic solvent, a colorant, and a surfactant, and has a predetermined surface life time as measured by a maximum bubble pressure method and a predetermined static surface tension, wherein the recording medium contains a support, and a recording layer provided at least one surface of the support, where the recording layer contains a cationic resin in a predetermined amount, and is a medium for a concealing postcard where the recording medium is folded to bond a surface of the recording layer to face each other with an adhesive after information is recorded on the surface of the recording layer, in which the surface of the recording layer has a predetermined 10-sec Cobb size degree.

7 Claims, 1 Drawing Sheet

(51) Int. Cl.
*C09D 11/322* (2014.01)
*C09D 11/40* (2014.01)
*B41J 2/21* (2006.01)

(56) References Cited

U.S. PATENT DOCUMENTS

| | | | |
|---|---|---|---|
| 5,810,915 A | 9/1998 | Nagai et al. |
| 5,879,439 A | 3/1999 | Nagai et al. |
| 5,882,390 A | 3/1999 | Nagai et al. |
| 5,972,082 A | 10/1999 | Koyano et al. |
| 5,993,524 A | 11/1999 | Nagai et al. |
| 6,120,589 A | 9/2000 | Bannai et al. |
| 6,231,652 B1 | 5/2001 | Koyano et al. |
| 6,261,349 B1 | 7/2001 | Nagai et al. |
| 6,613,136 B1 | 9/2003 | Arita et al. |
| 7,055,944 B2 | 6/2006 | Konishi |
| 7,284,851 B2 | 10/2007 | Bannai et al. |
| 7,682,011 B2 | 3/2010 | Namba et al. |
| 7,810,919 B2 | 10/2010 | Kojima et al. |
| 7,812,068 B2 | 10/2010 | Habashi et al. |
| 8,029,122 B2 | 10/2011 | Kojima et al. |
| 8,044,114 B2 | 10/2011 | Habashi et al. |
| 8,192,009 B2 | 6/2012 | Yokohama et al. |
| 8,304,043 B2 | 11/2012 | Nagashima et al. |
| 2002/0083866 A1 | 7/2002 | Arita et al. |
| 2002/0096085 A1 | 7/2002 | Gotoh et al. |
| 2003/0064206 A1 | 4/2003 | Koyano et al. |
| 2003/0076394 A1 | 4/2003 | Gotoh et al. |
| 2003/0107632 A1 | 6/2003 | Arita et al. |
| 2004/0103815 A1 | 6/2004 | Honma et al. |
| 2005/0007431 A1 | 1/2005 | Koyano et al. |
| 2005/0168552 A1 | 8/2005 | Arita et al. |
| 2006/0176349 A1 | 8/2006 | Nagai et al. |
| 2008/0248260 A1* | 10/2008 | Kojima et al. |
| 2008/0280044 A1* | 11/2008 | Okamura et al. |
| 2008/0302268 A1 | 12/2008 | Arita et al. |
| 2009/0263632 A1 | 10/2009 | Kojima et al. |
| 2010/0020142 A1 | 1/2010 | Bannai et al. |
| 2010/0236447 A1 | 9/2010 | Sakai |
| 2010/0271435 A1 | 10/2010 | Kojima et al. |
| 2011/0169889 A1 | 7/2011 | Kojima et al. |
| 2011/0205288 A1 | 8/2011 | Matsuyama et al. |
| 2011/0216123 A1 | 9/2011 | Tamai et al. |
| 2011/0310166 A1 | 12/2011 | Namba et al. |
| 2012/0133702 A1 | 5/2012 | Kojima |
| 2012/0133703 A1 | 5/2012 | Kojima |

FOREIGN PATENT DOCUMENTS

| | | |
|---|---|---|
| JP | 2004-168793 | 6/2004 |
| JP | 2008-308662 | 12/2008 |
| JP | 4230200 | 12/2008 |
| JP | 4230201 | 12/2008 |
| JP | 4272399 | 3/2009 |
| JP | 2010-214883 | 9/2010 |
| JP | 2010-275377 | 12/2013 |

OTHER PUBLICATIONS

U.S. Appl. No. 13/205,837, filed Aug. 9, 2011.

* cited by examiner

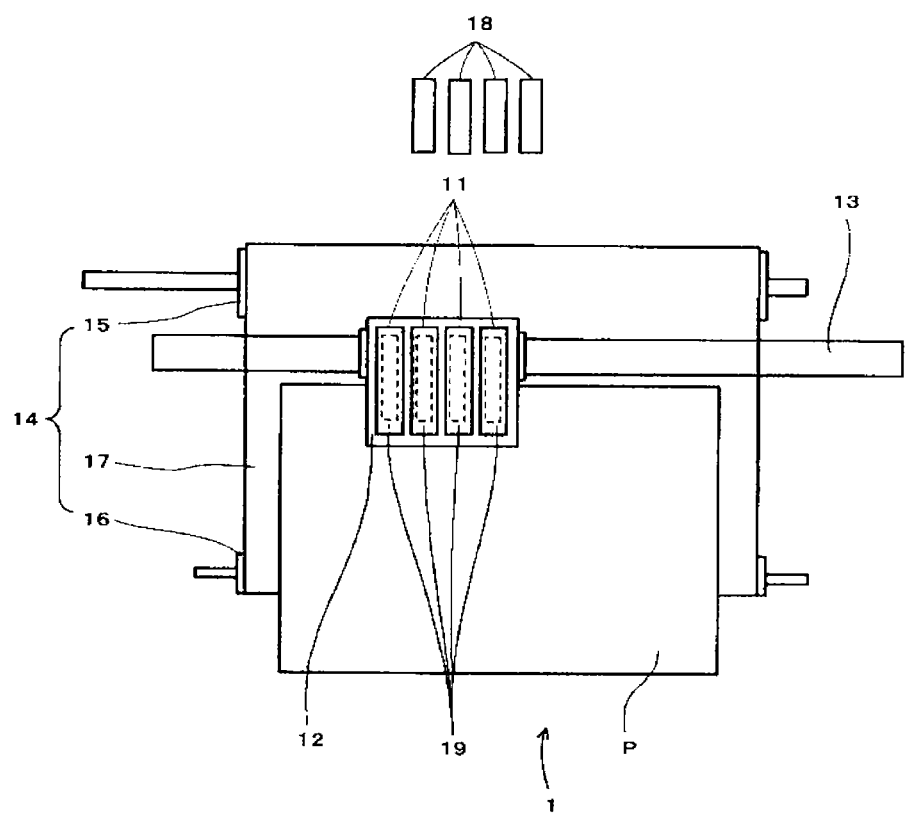

INKJET RECORDING METHOD, INKJET RECORDING DEVICE, AND INK RECORDED MATTER

BACKGROUND OF THE INVENTION

1. Field of the Invention

The present invention relates to an inkjet recording method, an inkjet recording device, and an inkjet recorded matter.

2. Description of the Related Art

An inkjet recording system is a recording system where ink droplets are jetted from very minute nozzles to deposit on a recording medium, to thereby form characters or an image. This system has been recently widely used because formation of a full-color image is easier compared to other recording system, and an image of high resolution can be obtained with a device of a simple structure.

Properties of an ink are indicated by physical properties, such as a viscosity and surface tension. An obtainable image quality or wetting ability of the ink can be controlled by regulating these physical properties.

When ink droplets are jetted, a new meniscus is formed at a jet outlet at the same time as the ink droplet is jetted. During this operation, the surface tension of the ink varies depending on the time, such as when a meniscus is started to be formed at the jet outlet, just before the ink droplet is jetted, the moment when the ink droplet is jetted, during jetting, the moment when the ink droplet is landed on a recording medium, and when the ink penetrates into the recording medium. Especially, the surface tension of the ink in the state where the motion thereof is slow, almost regarded as static, such as when a new meniscus is formed at the jet outlet, and when the ink is penetrates into the recording medium, and the surface tension of the ink in dynamic state where the motion thereof is fast, such as the moment when the ink droplets are jetted, are significantly different. Accordingly, when the properties of the inkjet recording ink are evaluated, it is important to consider the dynamic surface tension, which is surface tension in the dynamic state, as well as the static surface tension.

Typically, the static surface tension of the ink is preferably relatively low, as the static surface tension is related to the penetrating ability of the ink into a recording medium. On the other hand, the dynamic surface tension of the ink is related to jet stability of the ink, and therefore it needs to be certain strength. It has been known that these surface tensions of the ink can be controlled by a ratio of a surfactant or wetting agent added to the ink.

However, in accordance with the conventional controlling method, it has been difficult to secure certain strengths of both the static surface tension and the dynamic surface tension because the dynamic surface tension is reduced as the static surface tension is reduced, and in contrary, the static surface tension is increased, as the dynamic surface tension is increased. Therefore, there has been a problem that desirable jet stability and penetrating ability cannot be achieved at the same time.

Moreover, disclosed is a recording medium, such as an adhered concealing postcard, in which a releasable adhesive layer is provided on a surface of the recording medium after recording information on the surface of the recording medium by ink jet recording (for example, see Japanese Patent Application Laid-Open (JP-A) No. 2001-219680). In the disclosed recording medium, the coating layer provided at the surface is adjusted so that the adhesive component stays on the surface when the adhesive is applied, which results in poor penetrating ability of the ink. In order to enhance penetrating ability of the ink relative to such recording medium for a concealing postcard, it is effective to reduce the static surface tension of the ink. However, if the static surface tension is reduced, the dynamic surface tension is also reduced, and therefore jetting performance becomes unstable. Accordingly, there has been no inkjet recording ink, which has excellent penetrating ability to the aforementioned recording medium, and can form high quality images without blurring.

For the purpose of providing an ink composition capable of forming a high quality recording image, as well as having excellent jet stability, when it is used in an inkjet recording method, by regulating a relationship between dynamic surface tension in the state where a motion is fast and static surface tension in the state where a motion is slow, an ink set is disclosed, and in the disclosed ink set, differences in dynamic surface tension between the inks are regulated at surface life time of 100 ms and 1,000 ms (see, for example, JP-A No. 2004-168793).

However, in this literature, there is no countermeasure for a problem that the ink has low penetrating ability to the recording medium, and a problem of achieving both jet stability and penetrating ability has not been solved. Moreover, this ink set is not designed to be used on a recording medium for a concealing postcard, and thus there is a problem that a high quality image cannot be formed on a medium for a concealing postcard.

SUMMARY OF THE INVENTION

The present invention aims to solve the aforementioned various problems in the art and achieve the following object. An object of the present invention is to provide an inkjet recording method, in which low static surface tension of an ink and high dynamic surface tension of the ink are both achieved, and both excellent penetrating ability and jet stability of the ink are achieved, and which can provide a high quality image with preventing bleeding on a medium for a concealing postcard.

A means for solving the aforementioned problems is as follow. Specifically, the inkjet recording method of the present invention contains:

applying a stimulus to an inkjet recording ink to jet the inkjet recording ink, to thereby form an image on a recording medium, wherein the inkjet recording ink contains water, a water-soluble organic solvent, a colorant, and a surfactant, and satisfies the following conditions (1) to (4):

(1) dynamic surface tension ($D_1$) of the inkjet recording ink is 30.0 mN/m to 60.0 mN/m with a surface life time of 15 ms or longer but shorter than 100 ms, as measured by a maximum bubble pressure method, (2) dynamic surface tension ($D_2$) of the inkjet recording ink is 27.0 mN/m to 35.0 mN/m with a surface life time of 100 ms to 3,000 ms, as measured by a maximum bubble pressure method, (3) $D_1 \geq D_2$, and (4) static surface tension of the inkjet recording ink is 27.0 mN/m or less, wherein the recording medium contains a support, and a recording layer provided at least one surface of the support, where the recording layer contains a cationic resin in an amount of 1.0 g/m² to 2.0 g/m², and the recording medium is a medium for a concealing postcard where the recording medium is folded to bond a surface of the recording layer to face each other with an adhesive after information is recorded on the surface of the recording layer, in which the surface of the recording layer has a 10-sec Cobb size degree of 10 g/m² to 30 g/m² in accordance with JIS P8140.

The present invention can solve the aforementioned various problems in the art and achieve the aforementioned object, and can provide an inkjet recording method, in which low static surface tension of an ink and high dynamic surface tension of the ink are both achieved, and both excellent penetrating ability and jet stability of the ink are achieved, and which can provide a high quality image with preventing bleeding on a medium for a concealing postcard.

BRIEF DESCRIPTION OF THE DRAWINGS

FIG. 1 is a diagram illustrating one example of the inkjet recording device of the present invention.

DETAILED DESCRIPTION OF THE INVENTION (Inkjet Recording Method)

The inkjet recording method of the present invention is an inkjet recording method using an inkjet recording ink and a recording medium.

The inkjet recording method of the present invention preferably contains at least applying a stimulus to an inkjet recording ink to jet the inkjet recording ink to form an image on a recording medium (ink jetting step), and may further contain other steps, if necessary.

The stimulus is preferably heat, pressure, vibration, light, or any combination thereof.

<Inkjet Recording Ink>

The inkjet recording ink (may be referred to merely as an "ink" hereinafter) contains at least water, a water-soluble organic solvent, a colorant, and a surfactant, and may further contain other components, such as a foam inhibitor, and a penetrating agent, if necessary.

Moreover, the inkjet recording ink satisfies the following conditions (1) to (4).
(1) The dynamic surface tension ($D_1$) of the inkjet recording ink is 30.0 mN/m to 60.0 mN/m with a surface life time of 15 ms or longer but shorter than 100 ms, as measured by a maximum bubble pressure method.
(2) The dynamic surface tension ($D_2$) of the inkjet recording ink is 27.0 mN/m to 35.0 mN/m with a surface life time of 100 ms to 3,000 ms, as measured by a maximum bubble pressure method.
(3) $D_1 \geq D_2$.
(4) The static surface tension of the inkjet recording ink is 27.0 mN/m or less.

Here, the dynamic surface tension is a value measured by the maximum bubble pressure method at 24.0° C. to 26.0° C., and can be measured, for example, by means of a dynamic surface tensiometer SITA DYNOTESTER (manufactured by SITA Messtechnik). The "surface life time" is life time of a bubble generated in the maximum bubble pressure method, is also called as bubble life time, and indicates the time from a point when a new interface is generated within an edge of probe of the dynamic surface densitometer to a point when the maximum bubble pressure is generated.

Whether or not the conditions (1) to (2) are satisfied can be evaluated by measuring the dynamic surface tension at a few points within the numerical range of 15 ms or greater but less than 100 ms, or the numerical range of 100 ms to 3,000 ms, e.g., measuring the dynamic surface tension at 15 ms, 150 ms, 1,500 ms and 3,000 ms, and comparing the obtained regression curve with the predetermined numerical range of the dynamic surface tension.

As for the condition (3), the surface tension of a surfactant in a non-equilibrium state (i.e., dynamic surface tension) becomes close to an equilibrium state, as time passes (i.e., the surface life time becomes long), and eventually becomes equal to the static surface tension of the surfactant. Accordingly, the value at the certain surface life time among the dynamic surface tension ($D_1$) at the surface life time of 15 ms or greater but less than 100 ms in the maximum bubble pressure method is always equal to or larger than the value at the certain surface life time among the dynamic surface tension ($D_2$) at the surface life time of 100 ms to 3,000 ms.

As for the condition (4), the static surface tension can be measured, for example, by means of a full-automatic surface tensiometer (CBVP-Z, manufactured by Kyowa Interface Science Co., Ltd.) at 24.0° C. to 26.0° C.

<<Surfactant>>

The surfactant is used for reducing the surface tension of the ink to easily penetrate into a recording medium, or controlling the behavior of the dynamic surface tension.

An amount of the surfactant is appropriately selected depending on the intended purpose without any limitation, provided that a resulting ink satisfies the (1) to (4) above, but the amount of the surfactant is preferably 0.01% by mass to 5.0% by mass, more preferably 0.01% by mass to 1.0% by mass, relative to the ink. When the amount of the surfactant is 0.01% by mass or greater, sufficient penetrating property of the ink to a recording medium can be attained, and therefore image density is not lowered. When the amount thereof is 5.0% by mass or smaller, the resulting ink does not have excessively high viscosity, and therefore the viscosity thereof does not adversely affect jetting stability of the ink. When the amount thereof is 0.01% by mass to 1.0% by mass, it is advantageous in view of foaming and feathering.

The surfactant is appropriately selected depending on the intended purpose without any limitation, provided that a resulting ink satisfies the (1) to (4) above, and examples thereof include surfactants represented by the following general formulae (I) to (III). These surfactants may be used alone, or in combination.

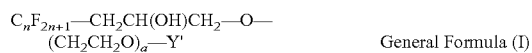

General Formula (I)

In the general formula (I), n is an integer of 2 to 6; a is an integer of 15 to 50; and Y' is —$C_bH_{2b+1}$ (b is an integer of 11 to 19) or —$CH_2CH(OH)CH_2$—$C_dF_{2d+1}$ (d is an integer of 2 to 6).

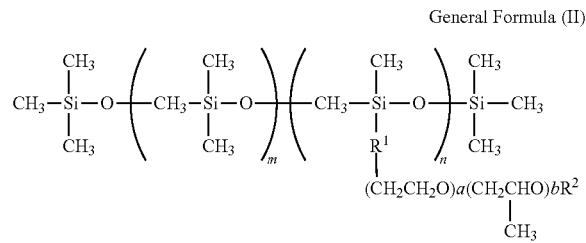

General Formula (II)

In the general formula, $R^1$ is a C1-C10 alkylene group; $R^2$ is hydrogen or a C1-C5 alkyl group; m is an integer of 0 to 10; n is an integer of 0 to 40; and a and b are each an integer of 1 to 20.

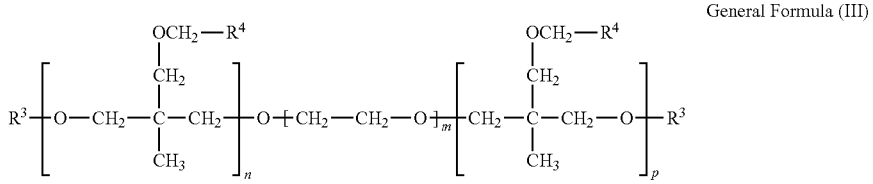

General Formula (III)

In the general formula (III), both $R^3$ may be the same or different, and each represent hydrogen, an alkyl group, or an acyl group; both $R^4$ may be the same or different, and each represent —$CF_3$, or —$CF_2CF_3$; n and p are each represent an integer of 1 to 4; and m is an integer of 1 to 25.

The surfactant represented by the general formula (I) is appropriately selected depending on the intended purpose without any limitation, but preferred are as follows:

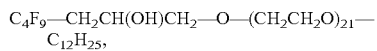

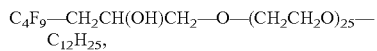

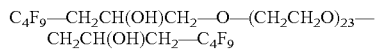

The surfactant represented by the general formula (II) is appropriately selected depending on the intended purpose without any limitation, but preferred is a surfactant represented by the general formula (II), where m=10, n=4, $R^1$=$CH_2$, $R^2$=H, a=6, and b=2.

The surfactant represented by the general formula (III) is appropriately selected depending on the intended purpose without any limitation, but preferred are a surfactant represented by the general formula (III) where $R^3$=H, $R^4$=$CF_2CF_3$, m=21, n=2, and p=2; a surfactant represented by the general formula (III) where $R^3$=H, $R^4$=$CF_2CF_3$, m=21, n=4, and p=3; a surfactant represented by the general formula (III) where $R^3$=$COCF_3$, $R^4$=$CF_2CF_3$, m=10, n=2, and p=2; a surfactant represented by the general formula (III) where $R^3$=$COCF_3$, $R^4$=$CF_2CF_3$, m=20, n=4, and p=4; and a surfactant represented by the general formula (III) where $R^3$=COH, $R^4$=$CF_2CF_3$, m=20, n=4, and p=4.

<<Water-Soluble Organic Solvent>>

The water-soluble organic solvent is appropriately selected depending on the intended purpose without any limitation, and examples thereof include: polyhydric alcohol, such as ethylene glycol, diethylene glycol, 1,3-butanediol, 3-methyl-1,3-butanediol, triethylene glycol, polyethylene glycol, polypropylene glycol, 1,5-pentanediol, 1,6-hexanediol, glycerin, 1,2,6-hexanetriol, ethyl-1,2,4-butanetriol, 1,2,3-butanetriol, and 3-methyl-1,3,5-pentanetriol; polyhydric alcohol alkyl ether, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ether, such as ethylene glycol monophenyl ether, and ethylene glycol monobenzyl ether; a nitrogen-containing heterocyclic compound, such as 2-pyrrolidone, N-methyl-2-pyrrolidone, N-hydroxyethyl-2-pyrrolidone, 1,3-dimethyl imidazolinone, ε-caprolactam, and γ-butyrolactone; amide, such as formamide, N-methyl formamide, and N,N-dimethyl formamide; amine, such as monoethanol amine, diethanol amine, and triethyl amine; a sulfur-containing compound, such as dimethyl sulfoxide, sulfolane, and thiodiethanol; and others, such as propylene carbonate and ethylene carbonate. These water-soluble organic solvents may be used alone or in combination.

Among them, preferred are 1,3-butanediol, diethylene glycol, triethylene glycol, and glycerin, as an excellent effect of preventing jetting failures due to evaporation of moisture can be attained.

<<Colorant>>

The colorant is used to color an ink and to improve image density, and the colorant is appropriately selected from conventional pigments and dyes known in the art depending on the intended purpose without any limitation. The colorant is preferably a pigment.

An amount of the pigment in the inkjet recording ink is appropriately selected depending on the intended purpose without any limitation, but the amount thereof is preferably 0.1% by mass to 50.0% by mass, more preferably 0.1% by mass to 20.0% by mass.

The 50% particle diameter (median diameter, D50) of the pigment is preferably 150 nm or smaller, more preferably 100 nm or smaller. Note that, the value of "D50" is a value measured by means of MICROTRAC UPA, manufactured by NIKKISO CO., LTD., in the atmosphere of 23° C., 55% RH in accordance with dynamic light scattering.

The pigment may be an inorganic pigment or an organic pigment, and these pigments may be used alone or in combination.

The inorganic pigment is appropriately selected depending on the intended purpose without any limitation, and examples thereof include titanium oxide, iron oxide, calcium carbonate, barium sulfate, aluminum hydroxide, barium yellow, iron blue, cadmium red, chrome yellow, metal powder, and carbon black. Among them, carbon black is preferable, and examples of the carbon black include those produced by conventional methods, such as a contact method, a furnace method, and a thermal method.

The organic pigment is appropriately selected depending on the intended purpose without any limitation, and examples thereof include an azo pigment, an azomethine pigment, a polycyclic pigment, a dye chelate, a nitro pigment, a nitroso pigment, and aniline black. Among them, preferred are an azo pigment and a polycyclic pigment.

The azo pigment is appropriately selected depending on the intended purpose without any limitation, and examples thereof include azo lake, an insoluble azo pigment, a condensed azo pigment, and a chelate azo pigment.

The polycyclic pigment is appropriately selected depending on the intended purpose without any limitation, and examples thereof include a phthalocyanine pigment, a perylene pigment, a perinone pigment, an anthraquinone pigment, a quinacridon pigment, a dioxazine pigment, an indigo pigment, a thioindigo pigment, an iso-indolinone pigment, a quinophtharone pigment, and a rhodamine lake pigment.

The dye chelate is appropriately selected depending on the intended purpose without any limitation, and examples thereof include basic dye chelate, and acid dye chelate.

The pigment for a black ink is appropriately selected depending on the intended purpose without any limitation, and examples thereof include: carbon black (C.I. Pigment Black 7), such as furnace black, lamp black acetylene black, and channel black; metals such as copper, iron (C.I. Pigment Black 11), and titanium oxide; and an organic pigment such as aniline black (C.I. Pigment Black 1).

As for the carbon black, preferred is carbon black produced by a furnace method or a channel method, which has a primary particle diameter of 15 nm to 40 nm, has BET specific surface area of 50 m²/g to 300 m²/g, has DBP oil absorption of 40 mL/100 g to 150 mL/100 g, has a volatile component of 0.5% to 10%, and has pH of 2 to 9.

A commercial product of the carbon black is appropriately selected depending on the intended purpose without any limitation, and examples thereof include: No. 2300, No. 900, MCF-88, No. 33, No. 40, No. 45, No. 52, MA7, MA8, MA100, and No. 2200B (all manufactured by Mitsubishi Chemical Corporation); Raven 700, Raven 5750, Raven 5250, Raven 5000, Raven 3500, and Raven 1255 (all manufactured by Columbian Chemicals Company); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all manufactured by Cabot Corporation); Carbon Black FW1, Carbon Black FW2, Carbon Black FW2V, Carbon Black FW18, Carbon Black FW100, Carbon Black FW200, Carbon Black S150, Carbon Black S160, Carbon Black S170, PRINTEX 35, PRINTEX U, PRINTEX V, PRINTEX 140U, PRINTEX 140V, Special Black 6, Special Black 5, Special Black 4A, and Special Black 4 (all manufactured by Evonik Degussa Japan Co., Ltd.).

As for a commercial product of the pigment for a color ink, example thereof for a yellow ink include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

Examples of the pigment for a magenta ink include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and Pigment Violet 19.

Examples of the pigment for a cyan ink include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66; C.I. Violet Blue 4, and C.I. Violet Blue 60.

Moreover, a pigment that is newly produced for the present invention can also be used, other than the above-listed commercial products.

Note that, when Pigment Yellow 74 is used as the yellow pigment, Pigment Red 122 and Pigment Violet 19 are used as the magenta pigment, and Pigment Blue 15:3 is used as the cyan pigment inks having excellent color tones and light resistance, as well as desirably balanced properties, can be attained.

As for the dye, those having excellent water resistance and light resistance are used among the dyes, which are classified into acid dyes, direct dyes, reactive dyes, and food dyes according to the color index. These dyes may be used as a mixture of a few dyes, or a mixture with other colorants, such as a pigment, if necessary. Note that, other colorants are added as long as they do not adversely affect the obtainable effect of the present invention.

Specific examples of the dyes are those as listed in the following (a) to (d).

(a) Acid Dyes and Food Dyes
C.I. Acid Yellow 17, 23, 42, 44, 79, 142
C.I. Acid Red 1, 8, 13, 14, 18, 26, 27, 35, 37, 42, 52, 82, 87, 89, 92, 97, 106, 111, 114, 115, 134, 186, 249, 254, 289
C.I. Acid Blue 9, 29, 45, 92, 249
C.I. Acid Black 1, 2, 7, 24, 26, 94
C.I. Food Yellow 3, 4
C.I. Food Red 7, 9, 14
C.I. Food Black 1, 2
(b) Direct Dye
C.I. Direct Yellow 1, 12, 24, 26, 33, 44, 50, 86, 120, 132, 142, 144
C.I. Direct Red 1, 4, 9, 13, 17, 20, 28, 31, 39, 80, 81, 83, 89, 225, 227
C.I. Direct Orange 26, 29, 62, 102
C.I. Direct Blue 1, 2, 6, 15, 22, 25, 71, 76, 79, 86, 87, 90, 98, 163, 165, 199, 202
C.I. Direct Black 19, 22, 32, 38, 51, 56, 71, 74, 75, 77, 154, 168, 171
(c) Basic Dye
C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91
C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112
C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155
C.I. Basic Black 2, 8
(d) Reactive Dye
C.I. Reactive Black 3, 4, 7, 11, 12, 17
C.I. Reactive Yellow 1, 5, 11, 13, 14, 20, 21, 22, 25, 40, 47, 51, 55, 65, 67
C.I. Reactive Red 1, 14, 17, 25, 26, 32, 37, 44, 46, 55, 60, 66, 74, 79, 96, 97
C.I. Reactive Blue 1, 2, 7, 14, 15, 23, 32, 35, 38, 41, 63, 80, 95

<<Other Components>>
—Foam Inhibitor—

The inkjet recording ink may contain a foam inhibitor to prevent foaming of the ink.

The foam inhibitor is appropriately selected depending on the intended purpose without any limitation, and examples thereof include those represented by the general formula (IV).

$$HOR_1R_3C-(CH_2)_m-CR_2R_4OH \qquad \text{General Formula (IV)}$$

In the general formula (IV), $R_1$ and $R_2$ are each independently a C3-C6 alkyl group; $R_3$ and $R_4$ are each independently a C1-C2 alkyl group; and m is an integer of 1 to 6.

Among them, 2,4,7,9-tetramethyldecane-4,7-diol is preferable as it exhibits an excellent effect of inhibiting foams.

An amount of the foam inhibitor in the ink is appropriately selected depending on the intended purpose without any limitation, but it is preferably 0.01% by mass to 10% by mass, more preferably 0.02% by mass to 5% by mass. When the amount of the foam inhibitor is smaller than 0.01% by mass, it may not be able to attain a sufficient effect of inhibiting foams. When the amount thereof is greater than 10% by mass, an effect of foam inhibition may be saturated even though the amount thereof added is increased, or the foam inhibitor may not be dissolved in the ink.

—Penetrating Agent—

The inkjet recording ink may contain a penetrating agent to enhance penetrating properties of the ink to a recording medium.

The penetrating agent is appropriately selected depending on the intended purpose without any limitation, and examples thereof include 2-ethyl-1,3-hexanediol, ethanol, isopropyl alcohol, ethylene glycol-n-butyl ether, alkyl benzene sulfonate, alkyl betaine, and 2,2,4-trimethyl-1,3-pentanediol. Among them, 2-ethyl-1,3-hexanediol is preferable in view of storage stability.

An amount of the penetrating agent in the ink is appropriately selected depending on the intended purpose without any limitation, but it is preferably 0.1% by mass to 4.5% by mass. When the amount thereof is smaller than 0.1% by mass, the drying property of a resulting ink becomes low, which may cause blurring of a recording image. When the amount thereof is greater than 4.5% by mass, dispersion stability of the colorant is impaired, which may cause clogging of a nozzle of a recording device, and may cause excessively high penetrating ability of the ink to a recording medium to thereby cause low density of a recorded matter, or strike through.

The physical properties of the inkjet recording ink are appropriately selected depending on the intended purpose without any limitation, provided that the inkjet recording ink satisfies the aforementioned conditions (1) to (4). The (1) dynamic surface tension of the inkjet recording ink with a surface life time of 15 ms or greater but less than 100 ms in accordance with the maximum bubble pressure method is 30.0 mN/m to 60.0 mN/m, preferably 30.0 mN/m to 45.0 mN/m. When the dynamic surface tension of the inkjet recording ink is 30.0 mN/m to 45.0 mN/m, it is advantageous in view of an initial loading property thereof to a head.

Moreover, the (2) dynamic surface tension of the inkjet recording ink with a surface life time of 100 ms to 3,000 ms in accordance with the maximum bubble pressure method is appropriately selected depending on the intended purpose without any limitation, provided that it is 27.0 mN/m to 35.0 mN/m.

Moreover, the (4) static surface tension is appropriately selected depending on the intended purpose without any limitation, provided that it is 27.0 mN/m or lower.

The physical properties of the inkjet recording ink are appropriately selected depending on the intended purpose without any limitation, provided that surface tension thereof satisfies the aforementioned conditions (1) to (4), but the viscosity and pH of the inkjet recording ink are preferably in the following ranges.

The viscosity of the inkjet recording ink is preferably 5 mPa·sec to 20 mPa·sec at 25° C., more preferably 5 mPa·sec to 10 mPa·sec. When the viscosity thereof is greater than the aforementioned range, it may be difficult to maintain jetting stability.

The pH of the inkjet recording ink is preferably 7 to 10.

The inkjet recording ink of the present invention is appropriately selected depending on the intended purpose without any limitation, and examples thereof include a black ink, a cyan ink, a magenta ink, and a yellow ink. When recording is performed using an ink set, which uses two or more of the aforementioned inks in combination, a multi-color image can be formed. When recording is performed using an ink set, which uses at least a black ink, a cyan ink, a magenta ink, and a yellow ink in combination, a full-color image can be formed.

<Recording Medium>

The recording medium contains a support, and a recording layer provided at least one surface of the support, where the recording layer contains a cationic resin in an amount of 1.0 $g/m^2$ to 2.0 $g/m^2$, and the recording medium is a medium for a concealing postcard where the recording medium is folded to bond a surface of the recording layer to face each other with an adhesive after information is recorded on the surface of the recording layer, in which the surface of the recording layer has a 10-sec Cobb size degree of 10 $g/m^2$ to 30 $g/m^2$ in accordance with JIS P8140.

The recording medium is appropriately selected depending on the intended purpose without any limitation, and examples thereof include a recording sheet disclosed in JP-A No. 2001-219680. A commercial product can be used as the recording medium, and examples of the commercial product thereof include DF COLOR IJP2.0 (manufactured by Mitsubishi Paper Mills Limited), and BRIGHT MAIL IJ (manufactured by Daio Paper Corporation).

In the present specification, the term "medium for a concealing postcard" means a recording medium, such as a releasable postcard, concealing postcard, and adhered postcard, in which a recorded matter containing a non-transparent support and information recorded thereon is folded in two or three, or two or more sheets of the recorded matter are laminated, and adhered using a releasable adhesive so that it can be sent apparently as one postcard, and a recipient can peel the releasable adhered portion(s) away and read the information provided inside.

<<Support>>

The support is appropriately selected depending on the intended purpose without any limitation, provided that the support is non-transparent, and examples thereof include commercially available wood free paper.

<<Recording Layer>>

The recording layer is appropriately selected depending on the intended purpose without any limitation, provided that the recording layer contains a cationic resin in an amount of 1.0 $g/m^2$ to 2.0 $g/m^2$.

—Cationic Resin—

The cationic resin is appropriately selected depending on the intended purpose without any limitation, and examples thereof include an alkyl amine-epihalohydrin polycondensate having a molecular weight of 20,000 or smaller disclosed in JP-A No. 2001-219680, a dimethyl amine-epichlorohydrin polycondensate, a dimethyl amine-ammonia-epichlorohydrin condensate, poly(trimethyl amino ethyl methacrylate-methyl sulfate), a diallylamine chloric acid salt-acryl amine copolymer, poly(diallylamine hydrochloride-sulfur dioxide), polyallyl amine chloric acid salt, poly(allylamine hydrochloride-diallylamine hydrochloride), an acryl amide-diallyl amine copolymer, a polyvinyl amine copolymer, dicyane diamide, a dicyanediamide-ammonium chloride-urea-formaldehyde condensate, a polyalkylene polyamine-dicyan diamide ammonium salt condensate, dimethyl diallyl ammonium chloride, polydiallylmethylamine hydrochloride, poly(diallyldimethyl ammonium chloride), poly(diallyldimethyl ammonium chloride-sulfur dioxide), poly(diallyldimethyl ammonium chloride-diallylamine hydrochloride derivative), an acryl amide-diallyldimethyl ammonium chloride copolymer, an acrylic acid salt-acryl amide-diallyl amine chloric acid salt copolymer, polyethylene imine, ethylene imine derivative, such as an acryl amine polymer, and a polyethylene imine alkylene oxide modified product. These may be used alone or in combination.

<<Adhesive>>

The adhesive is appropriately selected depending on the intended purpose without any limitation, provided that it is releasable. Examples of the adhesive include natural rubber, modified natural rubber, styrene-butadiene rubber, acrylonitrile-butadiene rubber, an ethylene-vinyl acetate copolymer resin, an acrylic acid ester resin, a vinyl chloride resin, a vinylidene chloride resin, and a thermoplastic elastomer. One of them or a mixture of them is used in the formed of emulsion. Among them, the adhesive is preferable an adhesive having the adhesive strength of 30 gf/25 mm to 200 gf/25 mm as measured by a 180° peeling test, and examples of such adhesive include: an adhesive containing 20% by mass to 30% by mass of a sodium salt of alkenyl succinic anhydride, 5% by mass to 15% by mass of acryl emulsion, and 5% by mass to 15% by mass of silica; an adhesive prepared by adding 5 parts by mass to 100 parts by mass of an additive, such as inorganic filler (e.g., microsilica) and corn starch to 100 parts by mass of an adhesive base, such as natural rubber latex, followed by adding 0.1% by mass to 1% by mass of a silane coupling agent, such as γ-mercaptopropyl trimethoxy silane; and an adhesive in which a resin compatible to the adhesive base, such as polyvinyl alcohol, or other additives are optionally further added to any of the above-listed adhesives.

The adhesive strength is a strength measured when the concealed postcard is cut into strips each having a width of 25 mm, and the obtained strip is peeled at an angle of 180° C. by TENSILON, a universal tensile testing machine, at peeling speed of 300 mm/min.

An amount of pure water transferred to the recording medium during a contact time of 100 ms as measured by a dynamic scanning absorptometer is appropriately selected depending on the intended purpose without any limitation, but it is preferably 2 mL/m$^2$ to 30 mL/m$^2$, more preferably 2 mL/m$^2$ to 15 mL/m$^2$. When the amount of the pure water transferred is less than 2 mL/m$^2$, color breeding or beading may occur. When the amount thereof is greater than 30 mL/m$^2$, printed characters may be blurred or image density may be low. On the other hand, the amount of the pure water transferred is in the range of 2 mL/m$^2$ to 15 mL/m$^2$, it is advantageous as desirable dissolution of fine lines can be achieved.

In the case where 5 μL of a droplet of the inkjet recording ink is dropped to the recording medium, a contact angle of the droplet 100 ms after dropping the droplet is appropriately selected depending on the intended purpose without any limitation, but it is preferably 16° to 32°. When the contact angle is less than 16°, printed characters may be blurred. When the contact angle is more than 32°, color bleeding or beading may occur.

(Inkjet Recording Device)

The inkjet recording device of the present invention contains at least an ink jetting unit, and may further contain other units, if necessary.

The ink jetting unit is a unit configured to apply a stimulus to the inkjet recording ink to jet the inkjet recording ink, to thereby form an image on a recording medium, where the inkjet recording ink and the recording medium are respectively the inkjet recording ink and the recording medium explained in the description of the inkjet recording method of the present invention.

The stimulus is preferably heat, pressure, vibration, light, or any combination thereof.

FIG. 1 illustrates one example of the inkjet recording device of the present invention. This recording device is configured to eject four color (black, cyan, magenta, and yellow) inks to a recording medium, such as a printing sheet, to thereby form an image.

The inkjet recording device 1 is equipped with four inkjet heads 11 not illustrated) each eject an ink of a respective color, a carriage 12 on which the inkjet heads are mounted, a guide rod 13 configured to guide the carriage 12 to be moved by a driving system (not illustrated) in a scanning direction (a side direction, i.e., left-right direction in the drawing), and a sheet conveying system 14 configured to convey a printing sheet P in a sub scanning direction (an up-down direction in the drawing). The sheet conveying system 14 contains a convey roller 15, which is rotated by a driving system (not illustrated), a tension roller 16, and a convey belt provided around these rollers.

Each inkjet head 11 is equipped with a piezoelectric actuator, composed of a piezoelectric element. As for another actuator to jet the ink, for example, the inkjet heat may be equipped with a thermal actuator, a memory metal actuator, or an electrostatic actuator.

Further, the inkjet recording device 1 contains four ink cartridges 18 each housing the ink of a respective color, four subtanks 19 that are mounted on the carriage 12, connected to respective inkjet heads 11 and house the four ink cartridges 18 in respective portions indicated by broken lines in FIG. 1, and ink supply tubes (not illustrated) to connect between each of the ink cartridges 18 with respective subtanks 19, so that the ink of each color housed in each ink cartridge 18 is supplied to each inkjet head 11 through each subtank 19. Specifically, a liquid flow path of the inkjet recording device 1 is composed of the ink supply tube, subtank 19 and a flow path inside the inkjet head 11. Note that, the ink supply tube is also provided with a supply pump (not illustrated) for supplying the ink inside the ink cartridge 18 to the subtank 19.

(Ink Recorded Matter)

The ink recorded matter of the present invention contains the recording medium, and an image formed on the recording medium by the inkjet recording method of the present invention.

EXAMPLES

The present invention will be more specifically explained through Examples hereinafter, but Examples shall not be construed to limit the scope of the present invention.

Production Example of Dispersion

Dispersion Production Example 1

Cyan Dispersion

With reference to Preparation Example 3 of JP-A No. 2001-139849, first, a polymer solution was prepared in the following manner. After purging a 1 L-flask equipped with a mechanical stirrer, a thermometer, a nitrogen gas inlet tube, a reflux tube, and a dropping funnel with nitrogen gas, the flask was charged with 11.2 g of styrene, 2.8 g of acrylic acid, 12.0 g of lauryl methacrylate, 4.0 g of polyethylene glycol methacrylate, 4.0 g of styrene macromer (product name: AS-6, manufacturer: TOAGOSEI CO., LTD.) and 0.4 g of mercapto ethanol, and the resulting mixture was heated to 65° C. Next, to the flask, a mixed solution containing 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (product name: AS-6, manufacturer: TOAGOSEI CO., LTD.) 3.6 g of mercapto ethanol, 2.4 g of azobis dimethylvaleronitrile, and 18 g of methyl ethyl ketone was added dropwise over 2.5 hours.

After completing the dropping, a mixed solution containing 0.8 g of azobis dimethylvaleronitrile and 18 g of methyl ethyl ketone was added dropwise to the flask over 0.5 hours. After aging the resultant for 1 hour at 65° C., 0.8 g of azobis dimethylvaleronitrile was added, and the resulting mixture was further aged for 1 hour. After completing the reaction, 364 g of methyl ethyl ketone was added into the flask, to thereby obtain 800 g of a polymer solution having a concentration of 50% by mass. Next, part of the obtained polymer solution was dried, and the obtained polymer was subjected to gel permeation chromatography (standard: polystyrene, solvent: tetrahydrofuran). As a result, it was found that the polymer had a weight average molecular weight of 15,000.

The above-obtained polymer solution (28 g), 26 g of a copper phthalocyanine pigment, 13.6 g of 1 mol/L potassium hydroxide aqueous solution, 20 g of methyl ethyl ketone, and 30 g of ion-exchanged water were mixed and sufficiently stirred. Thereafter, the mixture was kneaded twenty times by means of a three-roll mill (product name: NR-84A, manufacturer: Noritake Co., Limited). To the obtained paste, 200 g of ion-exchanged water was added, and the mixture was sufficiently stirred, followed by removing methyl ethyl ketone and water by an evaporator, to thereby obtain 160 g of Cyan Dispersion, which was a dispersion liquid of blue polymer particles and had a solid content of 20.0% by mass.

The polymer particles were subjected to the measurement of 50% particle diameter (median diameter, D50) by means of MICROTRAC UPA, and the result was 98 nm.

Dispersion Production Example 2

Magenta Dispersion

Magenta Dispersion (160 g), which was a dispersion liquid of reddish violet polymer particles, was obtained in the same manner as in Dispersion Production Example 1, provided that the copper phthalocyanine pigment was replaced with Pigment Red 122. The polymer particles were subjected to the measurement of 50% particle diameter (median diameter, D50) by means of MICROTRAC UPA, and the result was 124 nm.

Dispersion Production Example 3

Yellow Dispersion

Yellow Dispersion (160 g), which was a dispersion liquid of yellow polymer particles, was obtained in the same manner as in Dispersion Production Example 1, provided that the copper phthalocyanine pigment was replaced with Pigment Yellow 74. The polymer particles were subjected to the measurement of 50% particle diameter (median diameter, D50) by means of MICROTRAC UPA, and the result was 78 nm.

Dispersion Production Example 4

Black Dispersion

Black Dispersion (160 g), which was a dispersion liquid of black polymer particles, was obtained in the same manner as in Dispersion Production Example 1, provided that the copper phthalocyanine pigment was replaced with carbon black (FW100, manufactured by Evonik Degussa Japan Co., Ltd.). The polymer particles were subjected to the measurement of 50% particle diameter (median diameter, D50) by means of MICROTRAC UPA, and the result was 110 nm.

Ink Preparation Examples, Examples and Comparative Examples

Inks of Ink Preparation Examples 1 to 52 were prepared using Dispersion Production Examples 1 to 4 with the formulations depicted in Tables 1 to 13.

Specifically, materials were blended in the order of a water-soluble organic solvent, a surfactant, a foam inhibitor (defoaming agent), a penetrating agent, and ion exchanged water, and the mixture was stirred for 30 minutes. Then, to the mixture, each of Dispersion Production Examples 1 to 4 was added, followed by stirred for 30 minutes. Then, the resultant was filtered with a membrane filter having an opening diameter of 0.8 μm, to thereby obtain an ink. Four color inks were combined to thereby prepare ink sets of Examples 1 to 7 and Comparative Examples 1 to 6.

Note that, in Tables 1 to 13, the numbers represented "% by mass" and the surfactants for use was as described below.

Surfactant A

A surfactant represented by the following general formula (I), where n=4, a=21, and b=12.

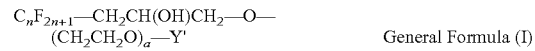

$$C_nF_{2n+1}-CH_2CH(OH)CH_2-O-(CH_2CH_2O)_a-Y' \qquad \text{General Formula (I)}$$

Surfactant B

A surfactant represented by the following general formula (II), where m=10, n=4, $R^1=CH_2$, $R^2=H$, a=6, and b=2.

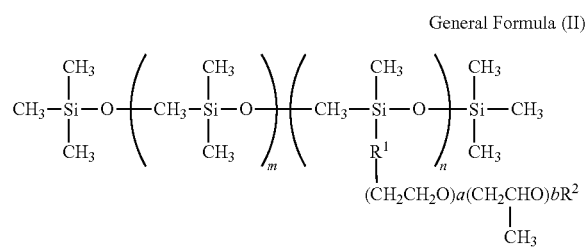

General Formula (II)

Surfactant C

A surfactant represented by the following general formula (III), where $R^3=H$, $R^4=-CF_2CF_3$, m=21, n=2, and p=2.

General Formula (III)

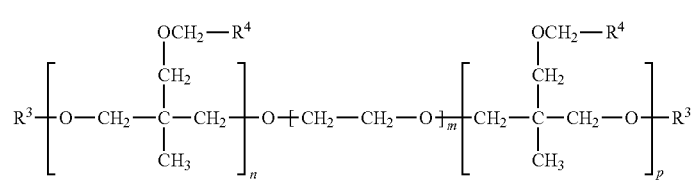

Surfactant D

A surfactant represented by the following general formula (V), where m=3, and n=13.

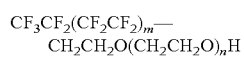
$$CF_3CF_2(CF_2CF_2)_m—CH_2CH_2O(CH_2CH_2O)_nH \quad \text{General Formula (V)}$$

Surfactant E

ECTD-3NEX (manufactured by Nikko Chemicals Co., Ltd.)

Surfactant F

A surfactant represented by the general formula (I) above, where n=4, a=23, and d=4.

Surfactant G

A surfactant represented by the general formula (III) above, where $R^3=COCF_3$, $R^4=CF_2CF_3$, m=10, n=2, and p=2.

Moreover, the abbreviations in Tables 10 and 11 represent as follows.

KM-72F: self-emulsified silicone defoaming agent (manufactured by Shin-Etsu Chemical Co., Ltd., ingredient 100% by mass)

BYK-1615: silicone defoaming agent (manufactured by BYK Japan KK, ingredient 100% by mass)

TABLE 1

| | | Example 1 | | | |
|---|---|---|---|---|---|
| | | Ink Preparation Ex. 1 | Ink Preparation Ex. 2 | Ink Preparation Ex. 3 | Ink Preparation Ex. 4 |
| Dispersion Production Ex. 1 | | 15.0 | | | |
| Dispersion Production Ex. 2 | | | 15.0 | | |
| Dispersion Production Ex. 3 | | | | 15.0 | |
| Dispersion Production Ex. 4 | | | | | 15.0 |
| Surfactant | Surfactant A | 0.06 | 0.06 | 0.06 | 0.06 |
| | Surfactant B | | | | |
| | Surfactant C | | | | |
| | Surfactant D | | | | |
| | Surfactant E | | | | |
| Water-soluble organic solvent | Glycerin | 8.0 | 7.5 | 8.0 | 7.0 |
| | 3-methyl-1,3-butanediol | | 23.0 | | |
| | 1,3-butanediol | 25.0 | | | |
| | 1,6-hexanediol | | | 22.5 | |
| | 1,5-pentanediol | | | | 24.;normal0 |

TABLE 1-continued

| | | Example 1 | | | |
|---|---|---|---|---|---|
| | | Ink Preparation Ex. 1 | Ink Preparation Ex. 2 | Ink Preparation Ex. 3 | Ink Preparation Ex. 4 |
| Foam inhibitor | 2,4,7,9-tetramethyldecane-4,7-diol | 0.25 | 0.25 | 0.25 | 0.25 |
| Penetrating agent | 2-ethyl-1,3-hexanediol | 2.0 | 2.0 | 2.0 | 2.0 |
| Pure water | | balance | balance | balance | balance |
| Total | | 100.0 | 100.0 | 100.0 | 100.0 |

TABLE 2

| | | Example 2 | | | |
|---|---|---|---|---|---|
| | | Ink Preparation Ex. 5 | Ink Preparation Ex. 6 | Ink Preparation Ex. 7 | Ink Preparation Ex. 8 |
| Dispersion Production Ex. 1 | | 15.0 | | | |
| Dispersion Production Ex. 2 | | | 15.0 | | |
| Dispersion Production Ex. 3 | | | | 15.0 | |
| Dispersion Production Ex. 4 | | | | | 15.0 |
| Surfactant | Surfactant A | 0.04 | 0.04 | 0.04 | 0.04 |
| | Surfactant B | | | | |
| | Surfactant C | | | | |
| | Surfactant D | | | | |
| | Surfactant E | | | | |
| Water-soluble organic solvent | Glycerin | 8.0 | 8.5 | 8.0 | 8.5 |
| | 3-methyl-1,3-butanediol | 22.5 | | 23.0 | |
| | 1,3-butanediol | | | | 23.0 |
| | 1,6-hexanediol | | 23.0 | | |
| | 1,5-pentanediol | | | | |
| Foam inhibitor | 2,4,7,9-tetramethyldecane-4,7-diol | 0.15 | 0.15 | 0.15 | 0.15 |
| Penetrating agent | 2-ethyl-1,3-hexanediol | 2.0 | 2.0 | 2.0 | 2.0 |
| Pure water | | balance | balance | balance | balance |
| Total | | 100.0 | 100.0 | 100.0 | 100.0 |

TABLE 3

| | | Example 3 | | | |
|---|---|---|---|---|---|
| | | Ink Preparation Ex. 9 | Ink Preparation Ex. 10 | Ink Preparation Ex. 11 | Ink Preparation Ex. 12 |
| Dispersion Production Ex. 1 | | 20.0 | | | |
| Dispersion Production Ex. 2 | | | 20.0 | | |
| Dispersion Production Ex. 3 | | | | 20.0 | |
| Dispersion Production Ex. 4 | | | | | 20.0 |
| Surfactant | Surfactant A | 0.02 | 0.02 | 0.02 | 0.02 |
| | Surfactant B | | | | |
| | Surfactant C | | | | |
| | Surfactant D | | | | |
| | Surfactant E | | | | |
| Water-soluble organic solvent | Glycerin | 12.0 | 12.0 | 12.0 | 12.0 |
| | 3-methyl-1,3-butanediol | | | 20.0 | 22.5 |
| | 1,3-butanediol | 20.0 | | | |
| | 1,6-hexanediol | | 21.5 | | |
| | 1,5-pentanediol | | | | |
| Foam inhibitor | 2,4,7,9-tetramethyldecane-4,7-diol | 0.1 | 0.1 | 0.1 | 0.1 |

TABLE 3-continued

|  |  | Example 3 | | | |
|---|---|---|---|---|---|
|  |  | Ink Preparation Ex. 9 | Ink Preparation Ex. 10 | Ink Preparation Ex. 11 | Ink Preparation Ex. 12 |
| Penetrating agent | 2-ethyl-1,3-hexanediol | 2.0 | 2.0 | 2.0 | 2.0 |
| Pure water |  | balance | balance | balance | balance |
| Total |  | 100.0 | 100.0 | 100.0 | 100.0 |

TABLE 4

|  |  | Example 4 | | | |
|---|---|---|---|---|---|
|  |  | Ink Preparation Ex. 13 | Ink Preparation Ex. 14 | Ink Preparation Ex. 15 | Ink Preparation Ex. 16 |
| Dispersion Production Ex. 1 |  | 15.0 |  |  |  |
| Dispersion Production Ex. 2 |  |  | 15.0 |  |  |
| Dispersion Production Ex. 3 |  |  |  | 15.0 |  |
| Dispersion Production Ex. 4 |  |  |  |  | 15.0 |
| Surfactant | Surfactant A | 0.04 | 0.04 | 0.04 | 0.04 |
|  | Surfactant B | 0.2 | 0.2 | 0.2 | 0.2 |
|  | Surfactant C |  |  |  |  |
|  | Surfactant D |  |  |  |  |
|  | Surfactant E |  |  |  |  |
| Water-soluble organic solvent | Glycerin | 8.0 | 8.0 | 8.5 | 7.5 |
|  | 3-methyl-1,3-butanediol |  | 25.5 |  | 26.0 |
|  | 1,3-butanediol |  |  | 27.0 |  |
|  | 1,6-hexanediol |  |  |  |  |
|  | 1,5-pentanediol | 25.0 |  |  |  |
| Foam inhibitor | 2,4,7,9-tetramethyldecane-4,7-diol |  |  |  |  |
| Penetrating agent | 2-ethyl-1,3-hexanediol | 2.0 | 2.0 | 2.0 | 2.0 |
| Pure water |  | balance | balance | balance | balance |
| Total |  | 100.0 | 100.0 | 100.0 | 100.0 |

TABLE 5

|  |  | Example 5 | | | |
|---|---|---|---|---|---|
|  |  | Ink Preparation Ex. 17 | Ink Preparation Ex. 18 | Ink Preparation Ex. 19 | Ink Preparation Ex. 20 |
| Dispersion Production Ex. 1 |  | 20.0 |  |  |  |
| Dispersion Production Ex. 2 |  |  | 20.0 |  |  |
| Dispersion Production Ex. 3 |  |  |  | 20.0 |  |
| Dispersion Production Ex. 4 |  |  |  |  | 20.0 |
| Surfactant | Surfactant A |  |  |  |  |
|  | Surfactant B |  |  |  |  |
|  | Surfactant C | 0.30 | 0.30 | 0.30 | 0.30 |
|  | Surfactant D |  |  |  |  |
|  | Surfactant E |  |  |  |  |
| Water-soluble organic solvent | Glycerin | 13.0 | 11.0 | 12.5 | 13.0 |
|  | 3-methyl-1,3-butanediol |  | 19.0 |  | 16.5 |
|  | 1,3-butanediol | 15.0 |  | 17.5 |  |
|  | 1,6-hexanediol |  |  |  |  |
|  | 1,5-pentanediol |  |  |  |  |
| Foam inhibitor | 2,4,7,9-tetramethyldecane-4,7-diol | 0.15 | 0.15 | 0.15 | 0.15 |
| Penetrating agent | 2-ethyl-1,3-hexanediol | 2.0 | 2.0 | 2.0 | 2.0 |
| Pure water |  | balance | balance | balance | balance |
| Total |  | 100.0 | 100.0 | 100.0 | 100.0 |

TABLE 6

| | | Example 6 | | | |
|---|---|---|---|---|---|
| | | Ink Preparation Ex. 21 | Ink Preparation Ex. 22 | Ink Preparation Ex. 23 | Ink Preparation Ex. 24 |
| Dispersion Production Ex. 1 | | 20.0 | | | |
| Dispersion Production Ex. 2 | | | 20.0 | | |
| Dispersion Production Ex. 3 | | | | 20.0 | |
| Dispersion Production Ex. 4 | | | | | 20.0 |
| Surfactant | Surfactant A | | | | |
| | Surfactant B | | | | |
| | Surfactant C | | | | |
| | Surfactant D | | | | |
| | Surfactant E | | | | |
| | Surfactant F | 0.05 | 0.04 | 0.05 | 0.04 |
| | Surfactant G | | | | |
| Water-soluble organic solvent | Glycerin | 8.0 | 7.5 | 8.0 | 7.0 |
| | 3-methyl-1,3-butanediol | 27.0 | | | |
| | 1,3-butanediol | | | | 30.0 |
| | 1,6-hexanediol | | 24.0 | | |
| | 1,5-pentanediol | | | 24.0 | |
| Foam inhibitor | 2,4,7,9-tetramethyldecane-4,7-diol | 0.25 | 0.20 | 0.25 | 0.20 |
| Penetrating agent | 2-ethyl-1,3-hexanediol | 2.0 | 2.0 | 2.0 | 2.0 |
| Pure water | | balance | balance | balance | balance |
| Total | | 100.0 | 100.0 | 100.0 | 100.0 |

TABLE 7

| | | Example 7 | | | |
|---|---|---|---|---|---|
| | | Ink Preparation Ex. 25 | Ink Preparation Ex. 26 | Ink Preparation Ex. 27 | Ink Preparation Ex. 28 |
| Dispersion Production Ex. 1 | | 15.0 | | | |
| Dispersion Production Ex. 2 | | | 15.0 | | |
| Dispersion Production Ex. 3 | | | | 15.0 | |
| Dispersion Production Ex. 4 | | | | | 15.0 |
| Surfactant | Surfactant A | | | | |
| | Surfactant B | | | | |
| | Surfactant C | | | | |
| | Surfactant D | | | | |
| | Surfactant E | | | | |
| | Surfactant F | | | | |
| | Surfactant G | 0.40 | 0.40 | 0.40 | 0.40 |
| Water-soluble organic solvent | Glycerin | 14.0 | 12.0 | 13.5 | 14.0 |
| | 3-methyl-1,3-butanediol | | 20.5 | | 17.0 |
| | 1,3-butanediol | 15.5 | | 18.5 | |
| | 1,6-hexanediol | | | | |
| | 1,5-pentanediol | | | | |
| Foam inhibitor | 2,4,7,9-tetramethyldecane-4,7-diol | 0.25 | 0.25 | 0.25 | 0.25 |
| Penetrating agent | 2-ethyl-1,3-hexanediol | 2.0 | 2.0 | 2.0 | 2.0 |
| Pure water | | balance | balance | balance | balance |
| Total | | 100.0 | 100.0 | 100.0 | 100.0 |

TABLE 8

| | Comparative Example 1 | | | |
|---|---|---|---|---|
| | Ink Preparation Ex. 29 | Ink Preparation Ex. 30 | Ink Preparation Ex. 31 | Ink Preparation Ex. 32 |
| Dispersion Production Ex. 1 | 15.0 | | | |
| Dispersion Production Ex. 2 | | 15.0 | | |
| Dispersion Production Ex. 3 | | | 15.0 | |
| Dispersion Production Ex. 4 | | | | 15.0 |

TABLE 8-continued

|  |  | Comparative Example 1 | | | |
|---|---|---|---|---|---|
|  |  | Ink Preparation Ex. 29 | Ink Preparation Ex. 30 | Ink Preparation Ex. 31 | Ink Preparation Ex. 32 |
| Surfactant | Surfactant A | 0.005 | 0.005 | 0.005 | 0.005 |
|  | Surfactant B |  |  |  |  |
|  | Surfactant C |  |  |  |  |
|  | Surfactant D |  |  |  |  |
|  | Surfactant E |  |  |  |  |
| Water-soluble organic solvent | Glycerin | 8.0 | 7.5 | 8.0 | 7.0 |
|  | 3-methyl-1,3-butanediol |  | 22.5 |  |  |
|  | 1,3-butanediol | 23.0 |  |  |  |
|  | 1,6-hexanediol |  |  | 24.5 |  |
|  | 1,5-pentanediol |  |  |  | 22.5 |
| Foam inhibitor | 2,4,7,9-tetramethyldecane-4,7-diol | 0.03 | 0.03 | 0.03 | 0.03 |
| Penetrating agent | 2-ethyl-1,3-hexanediol |  |  |  |  |
| Pure water |  | balance | balance | balance | balance |
| Total |  | 100.0 | 100.0 | 100.0 | 100.0 |

TABLE 9

|  |  | Comparative Example 2 | | | |
|---|---|---|---|---|---|
|  |  | Ink Preparation Ex. 33 | Ink Preparation Ex. 34 | Ink Preparation Ex. 35 | Ink Preparation Ex. 36 |
| Dispersion Production Ex. 1 |  | 15.0 |  |  |  |
| Dispersion Production Ex. 2 |  |  | 15.0 |  |  |
| Dispersion Production Ex. 3 |  |  |  | 15.0 |  |
| Dispersion Production Ex. 4 |  |  |  |  | 15.0 |
| Surfactant | Surfactant A | 0.100 | 0.100 | 0.100 | 0.100 |
|  | Surfactant B |  |  |  |  |
|  | Surfactant C |  |  |  |  |
|  | Surfactant D |  |  |  |  |
|  | Surfactant E |  |  |  |  |
| Water-soluble organic solvent | Glycerin | 8.0 | 8.5 | 8.0 | 8.5 |
|  | 3-methyl-1,3-butanediol |  |  |  | 23.0 |
|  | 1,3-butanediol |  |  | 23.0 |  |
|  | 1,6-hexanediol |  | 22.5 |  |  |
|  | 1,5-pentanediol | 22.0 |  |  |  |
| Foam inhibitor | 2,4,7,9-tetramethyldecane-4,7-diol | 0.03 | 0.03 | 0.03 | 0.03 |
| Penetrating agent | 2-ethyl-1,3-hexanediol | 2.0 | 2.0 | 2.0 | 2.0 |
| Pure water |  | balance | balance | balance | balance |
| Total |  | 100.0 | 100.0 | 100.0 | 100.0 |

TABLE 10

|  |  | Comparative Example 3 | | | |
|---|---|---|---|---|---|
|  |  | Ink Preparation Ex. 37 | Ink Preparation Ex. 38 | Ink Preparation Ex. 39 | Ink Preparation Ex. 40 |
| Dispersion Production Ex. 1 |  | 20.0 |  |  |  |
| Dispersion Production Ex. 2 |  |  | 20.0 |  |  |
| Dispersion Production Ex. 3 |  |  |  | 20.0 |  |
| Dispersion Production Ex. 4 |  |  |  |  | 20.0 |
| Surfactant | Surfactant A |  |  |  |  |
|  | Surfactant B |  |  |  |  |
|  | Surfactant C |  |  |  |  |
|  | Surfactant D | 3.0 | 3.0 | 3.0 | 3.0 |
|  | Surfactant E |  |  |  |  |
| Water-soluble organic | Glycerin | 20.0 | 20.0 | 24.0 | 22.0 |
|  | 3-methyl-1,3-butanediol |  |  | 14.5 |  |
|  | 1,3-butanediol | 18.0 | 16.0 |  |  |

TABLE 10-continued

|  |  | Comparative Example 3 | | | |
| --- | --- | --- | --- | --- | --- |
|  |  | Ink Preparation Ex. 37 | Ink Preparation Ex. 38 | Ink Preparation Ex. 39 | Ink Preparation Ex. 40 |
| solvent | 1,6-hexanediol |  |  |  | 14.0 |
|  | 1,5-pentanediol |  |  |  |  |
| Foam inhibitor (Defoaming agent) | KM-72F | 0.3 | 0.3 | 0.3 | 0.3 |
| Penetrating agent | 2-ethyl-1,3-hexanediol | 2.0 | 2.0 | 2.0 | 2.0 |
| Pure water |  | balance | balance | balance | balance |
| Total |  | 100.0 | 100.0 | 100.0 | 100.0 |

TABLE 11

|  |  | Comparative Example 4 | | | |
| --- | --- | --- | --- | --- | --- |
|  |  | Ink Preparation Ex. 41 | Ink Preparation Ex. 42 | Ink Preparation Ex. 43 | Ink Preparation Ex. 44 |
| Dispersion Production Ex. 1 |  | 20.0 |  |  |  |
| Dispersion Production Ex. 2 |  |  | 20.0 |  |  |
| Dispersion Production Ex. 3 |  |  |  | 20.0 |  |
| Dispersion Production Ex. 4 |  |  |  |  | 20.0 |
| Surfactant | Surfactant A |  |  |  |  |
|  | Surfactant B |  |  |  |  |
|  | Surfactant C |  |  |  |  |
|  | Surfactant D |  |  |  |  |
|  | Surfactant E | 1.5 | 1.5 | 1.5 | 1.5 |
| Water-soluble organic solvent | Glycerin | 15.0 | 16.0 | 15.5 | 18.0 |
|  | 3-methyl-1,3-butanediol | 22.0 |  | 22.0 |  |
|  | 1,3-butanediol |  |  |  |  |
|  | 1,6-hexanediol |  |  |  | 20.0 |
|  | 1,5-pentanediol |  | 23.0 |  |  |
| Foam inhibitor (Defoaming agent) | BYK-1615 | 0.5 | 0.5 | 0.5 | 0.5 |
| Penetrating agent | 2-ethyl-1,3-hexanediol | 2.0 | 2.0 | 2.0 | 2.0 |
| Pure water |  | balance | balance | balance | balance |
| Total |  | 100.0 | 100.0 | 100.0 | 100.0 |

TABLE 12

|  |  | Comparative Example 5 | | | |
| --- | --- | --- | --- | --- | --- |
|  |  | Ink Preparation Ex. 45 | Ink Preparation Ex. 46 | Ink Preparation Ex. 47 | Ink Preparation Ex. 48 |
| Dispersion Production Ex. 1 |  | 15.0 |  |  |  |
| Dispersion Production Ex. 2 |  |  | 15.0 |  |  |
| Dispersion Production Ex. 3 |  |  |  | 15.0 |  |
| Dispersion Production Ex. 4 |  |  |  |  | 15.0 |
| Surfactant | Surfactant A | 0.04 | 0.04 | 0.04 | 0.04 |
|  | Surfactant B |  |  |  |  |
|  | Surfactant C |  |  |  |  |
|  | Surfactant D |  |  |  |  |
|  | Surfactant E |  |  |  |  |
| Water-soluble organic solvent | Glycerin | 8.0 | 7.5 | 8.0 | 7.0 |
|  | 3-methyl-1,3-butanediol |  | 22.5 |  |  |
|  | 1,3-butanediol | 23.0 |  |  |  |
|  | 1,6-hexanediol |  |  | 24.5 |  |
|  | 1,5-pentanediol |  |  |  | 22.5 |

TABLE 12-continued

|  |  | Comparative Example 5 | | | |
|---|---|---|---|---|---|
|  |  | Ink Preparation Ex. 45 | Ink Preparation Ex. 46 | Ink Preparation Ex. 47 | Ink Preparation Ex. 48 |
| Foam inhibitor | 2,4,7,9-tetramethyldecane-4,7-diol | 0.5 | 0.5 | 0.5 | 0.5 |
| Penetrating agent | 2-ethyl-1,3-hexanediol | | | | |
| Pure water |  | balance | balance | balance | balance |
| Total |  | 100.0 | 100.0 | 100.0 | 100.0 |

TABLE 13

|  |  | Comparative Example 6 | | | |
|---|---|---|---|---|---|
|  |  | Ink Preparation Ex. 49 | Ink Preparation Ex. 50 | Ink Preparation Ex. 51 | Ink Preparation Ex. 52 |
| Dispersion Production Ex. 1 |  | 15.0 | | | |
| Dispersion Production Ex. 2 |  | | 15.0 | | |
| Dispersion Production Ex. 3 |  | | | 15.0 | |
| Dispersion Production Ex. 4 |  | | | | 15.0 |
| Surfactant | Surfactant A | | | | |
|  | Surfactant B | | | | |
|  | Surfactant C | | | | |
|  | Surfactant D | | | | |
|  | Surfactant E | 1.0 | 1.0 | 1.0 | 1.0 |
| Water-soluble organic solvent | Glycerin | 15.0 | 16.0 | 15.5 | 18.0 |
|  | 3-methyl-1,3-butanediol | 22.0 | | 22.0 | |
|  | 1,3-butanediol | | | | |
|  | 1,6-hexanediol | | | | 20.0 |
|  | 1,5-pentanediol | | 23.0 | | |
| Foam inhibitor (Defoaming agent) | BYK-1615 | 0.5 | 0.5 | 0.5 | 0.5 |
| Penetrating agent | 2-ethyl-1,3-hexanediol | 2.0 | 2.0 | 2.0 | 2.0 |
| Pure water |  | balance | balance | balance | balance |
| Total |  | 100.0 | 100.0 | 100.0 | 100.0 |

<Evaluation>

Ink Preparation Examples 1 to 52 were evaluated in the following manner.

<Surface Tension>

The relationships between dynamic surface tensions and surface life times, and static surface tensions of Ink Preparation Examples 1 to 52 prepared in Examples and Comparative Examples are presented in Tables 14 to 20. The dynamic surface tension was measured by means of a dynamic surface tensiometer, SITA DYNOTESTER (manufactured by SITA Messtechnik), in accordance with the maximum bubble pressure method. The static surface tension was measured by means of a fully automatic surface tensiometer (CBVP-Z, manufactured by Kyowa Interface Science Co., Ltd.). Note that, the numerical values in Tables 14 to 20 are values measured at 25° C.±0.5° C., and the unit thereof is "mN/m."

Note that, it is desirable that four color inks including cyan, magenta, yellow, and black have the similar surface tensions to prevent color bleeding.

TABLE 14

|  | Example 1 | | | | Example 2 | | | |
|---|---|---|---|---|---|---|---|---|
|  | Ink Prep. Ex. 1 | Ink Prep. Ex. 2 | Ink Prep. Ex. 3 | Ink Prep. Ex. 4 | Ink Prep. Ex. 5 | Ink Prep. Ex. 6 | Ink Prep. Ex. 7 | Ink Prep. Ex. 8 |
| Dynamic surface tension at 15 ms | 37.6 | 36.9 | 36.8 | 37.4 | 38.5 | 38.0 | 37.7 | 38.4 |
| Dynamic surface tension at 150 ms | 32.4 | 32.0 | 31.8 | 31.9 | 33.3 | 33.0 | 32.8 | 33.0 |
| Dynamic surface tension at 1,500 ms | 29.8 | 29.6 | 29.6 | 29.4 | 31.2 | 30.8 | 31.0 | 31.0 |
| Dynamic surface tension at 3,000 ms | 28.8 | 28.4 | 28.7 | 28.6 | 29.9 | 29.2 | 29.5 | 30.6 |
| Static surface tension | 22.3 | 22.1 | 21.6 | 21.7 | 22.5 | 21.8 | 22.1 | 21.7 |

TABLE 15

| | Example 3 | | | | Example 4 | | | |
|---|---|---|---|---|---|---|---|---|
| | Ink Prep. Ex. 9 | Ink Prep. Ex. 10 | Ink Prep. Ex. 11 | Ink Prep. Ex. 12 | Ink Prep. Ex. 13 | Ink Prep. Ex. 14 | Ink Prep. Ex. 15 | Ink Prep. Ex. 16 |
| Dynamic surface tension at 15 ms | 38.6 | 38.5 | 39.3 | 40.2 | 39.0 | 38.9 | 38.4 | 39.1 |
| Dynamic surface tension at 150 ms | 34.2 | 34.1 | 34.4 | 34.4 | 33.7 | 33.8 | 33.3 | 34.4 |
| Dynamic surface tension at 1,500 ms | 32.3 | 32.1 | 32.9 | 32.6 | 31.9 | 32.0 | 31.8 | 33.5 |
| Dynamic surface tension at 3,000 ms | 32.5 | 32.0 | 32.8 | 32.3 | 30.8 | 30.4 | 30.9 | 32.8 |
| Static surface tension | 22.9 | 24.5 | 24.0 | 26.5 | 23.0 | 22.8 | 22.9 | 23.5 |

TABLE 16

| | Example 5 | | | | Example 6 | | | |
|---|---|---|---|---|---|---|---|---|
| | Ink Prep. Ex. 17 | Ink Prep. Ex. 18 | Ink Prep. Ex. 19 | Ink Prep. Ex. 20 | Ink Prep. Ex. 21 | Ink Prep. Ex. 22 | Ink Prep. Ex. 23 | Ink Prep. Ex. 24 |
| Dynamic surface tension at 15 ms | 38.0 | 38.5 | 39.3 | 38.9 | 38.1 | 38.0 | 37.4 | 37.4 |
| Dynamic surface tension at 150 ms | 33.5 | 33.8 | 33.9 | 33.8 | 33.0 | 33.1 | 32.5 | 32.7 |
| Dynamic surface tension at 1,500 ms | 31.8 | 31.7 | 31.8 | 32.1 | 30.7 | 30.5 | 30.1 | 30.7 |
| Dynamic surface tension at 3,000 ms | 31.7 | 31.4 | 31.6 | 31.9 | 29.2 | 29.0 | 28.7 | 29.3 |
| Static surface tension | 22.8 | 23.5 | 23.1 | 24.4 | 21.4 | 21.0 | 21.1 | 22.4 |

TABLE 17

| | Example 7 | | | |
|---|---|---|---|---|
| | Ink Prep. Ex. 25 | Ink Prep. Ex. 26 | Ink Prep. Ex. 27 | Ink Prep. Ex. 28 |
| Dynamic surface tension at 15 ms | 37.5 | 37.9 | 38.7 | 38.3 |
| Dynamic surface tension at 150 ms | 33.0 | 33.4 | 33.3 | 33.2 |
| Dynamic surface tension at 1,500 ms | 31.4 | 31.2 | 31.2 | 31.4 |
| Dynamic surface tension at 3,000 ms | 31.2 | 31.0 | 31.0 | 31.2 |
| Static surface tension | 22.1 | 22.6 | 22.7 | 23.0 |

TABLE 18

|  | Comparative Example 1 | | | | Comparative Example 2 | | | |
| --- | --- | --- | --- | --- | --- | --- | --- | --- |
|  | Ink Prep. Ex. 29 | Ink Prep. Ex. 30 | Ink Prep. Ex. 31 | Ink Prep. Ex. 32 | Ink Prep. Ex. 33 | Ink Prep. Ex. 34 | Ink Prep. Ex. 35 | Ink Prep. Ex. 36 |
| Dynamic surface tension at 15 ms | 43.8 | 43.5 | 43.5 | 44.0 | 29.8 | 29.5 | 29.6 | 29.9 |
| Dynamic surface tension at 150 ms | 39.5 | 39.1 | 39.4 | 39.9 | 25.8 | 25.4 | 25.5 | 25.7 |
| Dynamic surface tension at 1,500 ms | 36.2 | 36.3 | 35.8 | 36.5 | 24.0 | 23.5 | 23.3 | 23.1 |
| Dynamic surface tension at 3,000 ms | 34.8 | 35.0 | 34.9 | 35.2 | 22.3 | 22.6 | 22.2 | 23.2 |
| Static surface tension | 31.4 | 32.0 | 31.5 | 32.1 | 18.9 | 19.5 | 19.3 | 19.6 |

TABLE 19

|  | Comparative Example 3 | | | | Comparative Example 4 | | | |
| --- | --- | --- | --- | --- | --- | --- | --- | --- |
|  | Ink Prep. Ex. 37 | Ink Prep. Ex. 38 | Ink Prep. Ex. 39 | Ink Prep. Ex. 40 | Ink Prep. Ex. 41 | Ink Prep. Ex. 42 | Ink Prep. Ex. 43 | Ink Prep. Ex. 44 |
| Dynamic surface tension at 15 ms | 37.6 | 37.3 | 37.4 | 34 | 38.7 | 38.3 | 38.1 | 36.8 |
| Dynamic surface tension at 150 ms | 28.4 | 28.2 | 28.3 | 26.7 | 29.3 | 29.5 | 29.2 | 28.6 |
| Dynamic surface tension at 1,500 ms | 24.7 | 24.9 | 25.0 | 24.5 | 25.7 | 26.2 | 25.9 | 25.6 |
| Dynamic surface tension at 3,000 ms | 24.3 | 24.7 | 24.9 | 24.3 | 25.5 | 25.9 | 25.6 | 25.4 |
| Static surface tension | 24.4 | 25.0 | 24.6 | 25.2 | 25.5 | 25.8 | 25.4 | 25.4 |

TABLE 20

|  | Comparative Example 5 | | | | Comparative Example 6 | | | |
| --- | --- | --- | --- | --- | --- | --- | --- | --- |
|  | Ink Prep. Ex. 45 | Ink Prep. Ex. 46 | Ink Prep. Ex. 47 | Ink Prep. Ex. 48 | Ink Prep. Ex. 49 | Ink Prep. Ex. 50 | Ink Prep. Ex. 51 | Ink Prep. Ex. 52 |
| Dynamic surface tension at 15 ms | 40.2 | 40.3 | 39.9 | 40.6 | 41.5 | 41.2 | 41.1 | 39.8 |
| Dynamic surface tension at 150 ms | 37.0 | 36.4 | 36.8 | 37.2 | 31.9 | 31.9 | 31.7 | 31.2 |
| Dynamic surface tension at 1,500 ms | 34.8 | 34.5 | 34.7 | 35.0 | 28.5 | 28.9 | 28.5 | 28.0 |

TABLE 20-continued

|  | Comparative Example 5 | | | | Comparative Example 6 | | | |
| --- | --- | --- | --- | --- | --- | --- | --- | --- |
|  | Ink Prep. Ex. 45 | Ink Prep. Ex. 46 | Ink Prep. Ex. 47 | Ink Prep. Ex. 48 | Ink Prep. Ex. 49 | Ink Prep. Ex. 50 | Ink Prep. Ex. 51 | Ink Prep. Ex. 52 |
| Dynamic surface tension at 3,000 ms | 32.9 | 32.8 | 33.0 | 33.5 | 28.2 | 28.3 | 28.1 | 27.9 |
| Static surface tension | 18.3 | 18.2 | 18.5 | 18.6 | 28.2 | 28.2 | 28.0 | 27.8 |

<Contact Angle>

Contact angles of Ink Preparation Examples 1 to 52 prepared in Examples and Comparative Examples with respect to a recording medium were measured. The results are presented in Table 21. As for the measurement of a contact angle of the ink, OCA200H (manufactured by Kyowa Interface Science Co., Ltd.) was used, and 5 μL of the ink was dropped on the recording medium by a microsyringe, and a value of a contact angle after 100 ms from the dropping was determined as the contact angle.

As for the recording medium, Recording Sheet 1 and Recording Sheet 2 were used. Note that, Recording Sheet 1 is DF COLOR IJP2.0 (manufactured by Mitsubishi Paper Mills Limited), Recording Sheet 2 is MY PAPER (manufactured by Ricoh Company Limited), and a unit for the values in Table 21 is "°." Note that, DF COLOR IJP2.0 is a medium for a concealing postcard having, at a surface thereof, a coating layer (1.5 g/m$^2$) containing a cationic resin, and MY PAPER is plain paper. The 10-sec Cobb size degrees of Recording Sheet 1 and Recording Sheet 2 were respectively 15.0 g/m$^2$ and 20.8 g/m$^2$. Moreover, amounts of pure water transferred to Recording Sheet 1 and Recording Sheet 2 with contact time of 100 ms, as measured by a dynamic scanning absorptometer, were respectively 7.4 mL/m$^2$ and 14.7 mL/m$^2$.

TABLE 21

|  |  | Cyan | Magenta | Yellow | Black |
| --- | --- | --- | --- | --- | --- |
| Ex. 1 | Recording sheet 1 | 18 | 19 | 19 | 18 |
|  | Recording sheet 2 | 13 | 14 | 13 | 13 |
| Ex. 2 | Recording sheet 1 | 19 | 20 | 19 | 19 |
|  | Recording sheet 2 | 14 | 14 | 14 | 14 |
| Ex. 3 | Recording sheet 1 | 30 | 30 | 29 | 30 |
|  | Recording sheet 2 | 25 | 25 | 24 | 25 |
| Ex. 4 | Recording sheet 1 | 31 | 30 | 29 | 31 |
|  | Recording sheet 2 | 25 | 25 | 24 | 24 |
| Ex. 5 | Recording sheet 1 | 27 | 27 | 25 | 26 |
|  | Recording sheet 2 | 21 | 22 | 21 | 21 |
| Ex. 6 | Recording sheet 1 | 29 | 29 | 28 | 29 |
|  | Recording sheet 2 | 23 | 23 | 22 | 22 |
| Ex. 7 | Recording sheet 1 | 26 | 26 | 25 | 25 |
|  | Recording sheet 2 | 21 | 21 | 21 | 21 |
| Comp. Ex. 1 | Recording sheet 1 | 36 | 35 | 35 | 35 |
|  | Recording sheet 2 | 32 | 31 | 31 | 30 |
| Comp. Ex. 2 | Recording sheet 1 | 12 | 13 | 13 | 12 |
|  | Recording sheet 2 | 9 | 10 | 9 | 9 |
| Comp. Ex. 3 | Recording sheet 1 | 14 | 15 | 14 | 15 |
|  | Recording sheet 2 | 10 | 10 | 10 | 10 |
| Comp. Ex. 4 | Recording sheet 1 | 29 | 30 | 30 | 29 |
|  | Recording sheet 2 | 24 | 24 | 23 | 23 |
| Comp. Ex. 5 | Recording sheet 1 | 15 | 14 | 14 | 14 |
|  | Recording sheet 2 | 11 | 11 | 11 | 11 |
| Comp. Ex. 6 | Recording sheet 1 | 31 | 32 | 31 | 31 |
|  | Recording sheet 2 | 26 | 27 | 26 | 26 |

<Penetrating Ability>

Printing was performed on Recording Sheet 1 and Recording Sheet 2 by means of a printer (IPSIO GXE3300, manufactured by Ricoh Company Limited). As for a printing pattern, a chart in which printing area of each color was 5% relative to a total area of the sheet was used, and each ink of the present invention of yellow, magenta, cyan, and black was printed at 100%-duty. As for the printing conditions, the recording density was 600 dpi, and the printing was carried out with one-pass printing.

Thirty seconds after the printing, MY PAPER (manufactured by Ricoh Company Limited) was placed on the printed side of the recording sheet, and the recording sheet was rubbed along the same line 20 times while applying load of 1 kg. After the rubbing, the ink smear on MY PAPER was evaluated on the following criteria.

[Evaluation Criteria]
A: The ink smear was hardly observed.
B: There were a few areas where the ink smears were dark.
C: The ink smear was observed entirely.
D: The significant ink smear was observed entirely.

Within the criteria above, B or higher is acceptable. The evaluation results are presented in Table 22.

TABLE 22

|  |  | Cyan | Magenta | Yellow | Black |
| --- | --- | --- | --- | --- | --- |
| Ex. 1 | Recording sheet 1 | B | B | B | B |
|  | Recording sheet 2 | A | A | A | A |
| Ex. 2 | Recording sheet 1 | B | B | B | B |
|  | Recording sheet 2 | A | A | A | A |
| Ex. 3 | Recording sheet 1 | B | B | B | B |
|  | Recording sheet 2 | A | A | A | A |
| Ex. 4 | Recording sheet 1 | B | B | B | B |
|  | Recording sheet 2 | A | A | A | A |
| Ex. 5 | Recording sheet 1 | B | B | B | B |
|  | Recording sheet 2 | A | A | A | A |
| Ex. 6 | Recording sheet 1 | B | B | B | B |
|  | Recording sheet 2 | A | A | A | A |
| Ex. 7 | Recording sheet 1 | B | B | B | B |
|  | Recording sheet 2 | A | A | A | A |
| Comp. Ex. 1 | Recording sheet 1 | D | D | D | D |
|  | Recording sheet 2 | A | A | A | A |
| Comp. Ex. 2 | Recording sheet 1 | C | C | C | C |
|  | Recording sheet 2 | A | A | A | A |
| Comp. Ex. 3 | Recording sheet 1 | D | D | D | D |
|  | Recording sheet 2 | A | A | A | A |
| Comp. Ex. 4 | Recording sheet 1 | D | D | D | D |
|  | Recording sheet 2 | A | A | A | A |
| Comp. Ex. 5 | Recording sheet 1 | C | C | C | C |
|  | Recording sheet 2 | A | A | A | A |
| Comp. Ex. 6 | Recording sheet 1 | D | D | D | D |
|  | Recording sheet 2 | B | B | B | B |

<Jet Stability>

Printing was performed on MY PAPER (manufactured by Ricoh Company Limited) by means of a printer (IPSIO GXE3300, manufactured by Ricoh Company Limited). As for a printing pattern, a chart in which printing area of each color was 5% relative to a total area of the sheet was used, and each ink of the present invention of yellow, magenta, cyan, and black was printed at 100%-duty. As for the printing conditions, the recording density was 600 dpi, and the printing was carried out with one-pass printing.

As for the printing, intermittent printing was performed in the following manner. After continuously printing the aforementioned chart on 20 sheets, the printer was turned into a resting state for 20 minutes during which jetting was not performed. This process was continued 50 times until 1,000 sheets were printed in total. Then, the same chart was printed again, and the resultant was visually observed whether there was any streak, white void, and jetting disturbance in the 5% chart solid image area.

[Evaluation Criteria]

AA: There were none of streaks, white voids, and jetting disturbance in the solid image area.

A: There were one channel or more of streaks, white voids, and jetting disturbance in the solid image area after one scan.

B: Streaks, white voids, and jetting disturbance were slightly observed in the solid image area after one scan.

C: Streaks, white voids, and jetting disturbance were observed after one scan.

D: Streaks, white voids, and jetting disturbance were observed in the entire solid image area.

Within the criteria above, A or higher is acceptable. The evaluation results are presented in Tables 23.

TABLE 23

|  | Cyan | Magenta | Yellow | Black |
|---|---|---|---|---|
| Ex. 1 | A | A | A | A |
| Ex. 2 | AA | AA | AA | AA |
| Ex. 3 | AA | AA | AA | AA |
| Ex. 4 | AA | AA | AA | AA |
| Ex. 5 | AA | AA | AA | AA |
| Ex. 6 | AA | AA | AA | AA |
| Ex. 7 | AA | AA | AA | AA |
| Comp. Ex. 1 | D | D | D | D |
| Comp. Ex. 2 | D | D | D | D |
| Comp. Ex. 3 | B | B | B | B |
| Comp. Ex. 4 | C | C | C | C |
| Comp. Ex. 5 | C | C | C | C |
| Comp. Ex. 6 | B | B | B | B |

<Evaluation of Bleeding Between Black and Other Colors>

Printing was performed on Recording Sheet 1 and Recording Sheet 2 by means of a printer (IPSIO GXE3300, manufactured by Ricoh Company Limited). As for the printing pattern, a cyan ink, a magenta ink and a yellow ink were printed at 100%-duty. Characters of a black ink were printed on a solid image of each of the color inks, and bleeding between the color ink and the black ink was visually observed and evaluated with a loupe, and evaluated based on the following criteria. As for the printing conditions, the recording density was 600 dpi, and printing was carried out with one-pass printing.

[Evaluation Criteria]

AA: Bleeding did not occur at all, black characters could be clearly recognized, and blurring could not be recognized visually nor with a loupe.

A: No bleeding occurred, black characters could be clearly recognized, and blurring could not be visually recognized although blurring could slightly be recognized with a loupe.

B: No bleeding occurred, black characters could be clearly recognized, and blurring could not be visually recognized although blurring could be recognized with a loupe.

C: Bleeding occurred slightly, and black characters were slightly blurred.

D: Bleeding occurred, and it was difficult to recognize black characters.

Within the criteria above, B or higher is an acceptable. The evaluation results are presented in Table 24.

TABLE 24

|  |  | Cyan | Magenta | Yellow |
|---|---|---|---|---|
| Ex. 1 | Recording sheet 1 | B | B | B |
|  | Recording sheet 2 | A | A | A |
| Ex. 2 | Recording sheet 1 | A | A | A |
|  | Recording sheet 2 | A | A | A |
| Ex. 3 | Recording sheet 1 | A | A | A |
|  | Recording sheet 2 | AA | AA | AA |
| Ex. 4 | Recording sheet 1 | A | A | A |
|  | Recording sheet 2 | A | A | A |
| Ex. 5 | Recording sheet 1 | A | A | A |
|  | Recording sheet 2 | A | A | A |
| Ex. 6 | Recording sheet 1 | A | A | A |
|  | Recording sheet 2 | AA | AA | AA |
| Ex. 7 | Recording sheet 1 | A | A | A |
|  | Recording sheet 2 | A | A | A |
| Comp. Ex. 1 | Recording sheet 1 | C | C | C |
|  | Recording sheet 2 | A | A | A |
| Comp. Ex. 2 | Recording sheet 1 | D | D | D |
|  | Recording sheet 2 | B | B | B |
| Comp. Ex. 3 | Recording sheet 1 | D | D | D |
|  | Recording sheet 2 | B | B | B |
| Comp. Ex. 4 | Recording sheet 1 | D | D | D |
|  | Recording sheet 2 | B | B | B |
| Comp. Ex. 5 | Recording sheet 1 | C | C | C |
|  | Recording sheet 2 | B | B | B |
| Comp. Ex. 6 | Recording sheet 1 | D | D | D |
|  | Recording sheet 2 | B | B | B |

In the evaluation of the penetrating ability, it was found from the comparison between the inks of Examples 1 to 7 with the inks of Comparative Examples 1 to 6 that the penetrating ability could be improved by optimizing the surface tension of the ink relative to the medium for a concealing postcard.

In the evaluation of the jet stability, it was found from the comparison between the inks of Examples 1 to 7 with the inks of Comparative Examples 1 to 6 that the jet stability was adversely influenced with the excessively high surface tension as well as the excessively low surface tension relative to the medium for a concealing postcard.

In the evaluation of the bleeding, it was found from the comparison between the inks of Examples 1 to 7 with the inks of Comparative Examples 1 to 6 that the bleeding could be prevented by optimizing the values of the surface tension of the color inks and the black ink, because the vehicle was penetrated into the medium for a concealing postcard, which did not absorb the ink very well, and the coloring material was uniformly deposited on the surface of the medium.

The embodiments of the present invention are, for example, as follows:

<1> An inkjet recording method, containing:
applying a stimulus to an inkjet recording ink to jet the inkjet recording ink, to thereby form an image on a recording medium,
wherein the inkjet recording ink contains water, a water-soluble organic solvent, a colorant, and a surfactant, and satisfies the following conditions (1) to (4):
(1) dynamic surface tension ($D_1$) of the inkjet recording ink is 30.0 mN/m to 60.0 mN/m with a surface life time of 15 ms or longer but shorter than 100 ms, as measured by a maximum bubble pressure method,
(2) dynamic surface tension ($D_{29}$) of the inkjet recording ink is 27.0 mN/m to 35.0 mN/m with a surface life time of 100 ms to 3,000 ms, as measured by a maximum bubble pressure method,
(3) $D_1 \geq D_2$, and
(4) static surface tension of the inkjet recording ink is 27.0 mN/m or less,
wherein the recording medium contains a support, and a recording layer provided at least one surface of the support, where the recording layer contains a cationic resin in an amount of 1.0 g/m² to 2.0 g/m², and the recording medium is a medium for a concealing postcard where the recording medium is folded to bond a surface of the recording layer to face each other with an adhesive after information is recorded on the surface of the recording layer, in which the surface of the recording layer has a 10-sec Cobb size degree of 10 g/m² to 30 g/m² in accordance with JIS P8140.
<2> The inkjet recording method according to <1>, wherein the inkjet recording ink is an ink set containing at least four color inks including a black ink, a cyan ink, a magenta ink, and a yellow ink.
<3> The inkjet recording method according to <1> or <2>, wherein the surfactant is a surfactant represented by the following general formula (I), a surfactant represented by the following general formula (II), a surfactant represented by the following general formula (III), or any combination thereof:

$$C_nF_{2n+1}-CH_2CH(OH)CH_2-O-(CH_2CH_2O)_a-Y'$$ General Formula (I)

where n is an integer of 2 to 6; a is an integer of 15 to 50; Y' is $-C_bH_{2b+1}$ (b is an integer of 11 to 19) or $-CH_2CH(OH)CH_2-C_dF_{2d+1}$ (d is an integer of 2 to 6),

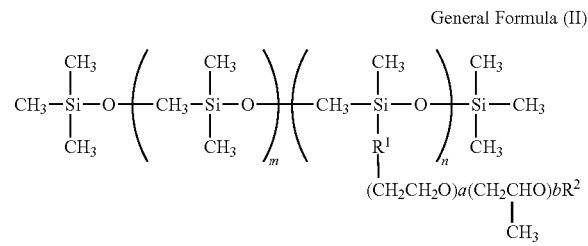

General Formula (II)

where $R^1$ is a C1-C10 alkylene group; $R^2$ is hydrogen or a C1-C5 alkyl group; m is an integer of 0 to 10; n is an integer of 0 to 40; and a and b are each an integer of 1 to 20,

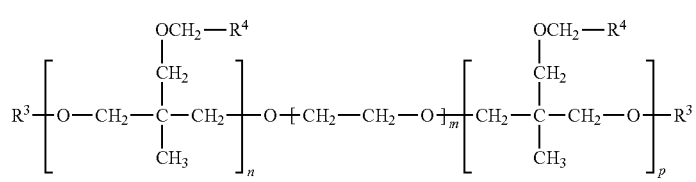

General Formula (III)

where both $R^3$ may be the same or different, and are each hydrogen, an alkyl group, or an acyl group; both $R^4$ may be the same or different, and are each $-CF_3$, or $-CF_2CF_3$; n and p are each an integer of 1 to 4; and m is an integer of 1 to 25.
<4> The inkjet recording method according to any one of <1> to <3>, wherein an amount of pure water transferred to the recording medium during a contact time of 100 ms as measured by a dynamic scanning absorptometer is 2 mL/m² to 30 mL/m².
<5> The inkjet recording method according to any one of <1> to <4>, wherein a contact angle of a droplet of the inkjet recording ink is 16° to 32° in 100 ms after dropping 5 μL of the droplet of the inkjet recording ink onto a surface of the recording medium.
<6> An inkjet recording device containing:
an ink jetting unit configured to apply a stimulus to an inkjet recording ink to jet the inkjet recording ink, to thereby form an image on a recording medium,
the inkjet recording ink contains water, a water-soluble organic solvent, a colorant, and a surfactant, and satisfies the following conditions (1) to (4):
(1) dynamic surface tension ($D_1$) of the inkjet recording ink is 30.0 mN/m to 60.0 mN/m with a surface life time of 15 ms or longer but shorter than 100 ms, as measured by a maximum bubble pressure method,
(2) dynamic surface tension ($D_2$) of the inkjet recording ink is 27.0 mN/m to 35.0 mN/m with a surface life time of 100 ms to 3,000 ms, as measured by a maximum bubble pressure method,
(3) $D_1 \geq D_2$, and
(4) static surface tension of the inkjet recording ink is 27.0 mN/m or less,
wherein the recording medium contains a support, and a recording layer provided at least one surface of the support, where the recording layer contains a cationic resin in an amount of 1.0 g/m² to 2.0 g/m², and the recording medium is a medium for a concealing postcard where the recording medium is folded to bond a surface of the recording layer to face each other with an adhesive after information is recorded on the surface of the recording layer, in which the surface of the recording layer has a 10-sec Cobb size degree of 10 g/m² to 30 g/m² in accordance with JIS P8140.
<7> The inkjet recording device according to <6>, wherein the stimulus is heat, pressure, vibration, light, or any combination thereof.
<8> An ink recorded matter containing:
a recording medium; and
an image formed on the recording medium by the inkjet recording method according to any one of <1> to <5>.

This application claims priority to Japanese application No. 2012-112641, filed on May 16, 2012 and Japanese application No. 2013-098081, filed on May 8, 2013, and incorporated herein by reference.

What is claimed is:

1. An inkjet recording method, comprising:
applying a stimulus to an inkjet recording ink to jet the inkjet recording ink, to thereby form an image on a recording medium,
wherein the inkjet recording ink comprises water, a water-soluble organic solvent, a colorant, and a surfactant, and satisfies conditions (1) to (4):
(1) dynamic surface tension ($D_1$) of the inkjet recording ink is 30.0 mN/m to 60.0 mN/m with a surface life time of 15 ms or longer but shorter than 100 ms, as measured by a maximum bubble pressure method,
(2) dynamic surface tension ($D_2$) of the inkjet recording ink is 27.0 mN/m to 35.0 mN/m with a surface life time of 100 ms to 3,000 ms, as measured by a maximum bubble pressure method,
(3) $D_1 \geq D_2$, and
(4) static surface tension of the inkjet recording ink is 27.0 mN/m or less,
wherein the recording medium contains a support, and a recording layer provided at least one surface of the support, where the recording layer contains a cationic resin in an amount of 1.0 g/m² to 2.0 g/m², and the recording medium is a medium for a concealing postcard where the recording medium is folded to bond a surface of the recording layer to face each other with an adhesive after information is recorded on the surface of the recording layer, in which the surface of the recording layer has a 10-sec Cobb size degree of 10 g/m² to 30 g/m² in accordance with JIS P8140, and
wherein the surfactant is a surfactant represented by the following general formula (I), a surfactant represented by the following general formula (II), a surfactant represented by the following general formula (III), or any combination thereof:

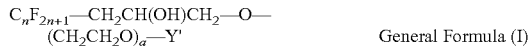

General Formula (I)

where n is an integer of 2 to 6; a is an integer of 15 to 50; Y' is —$C_bH_{2b+1}$ (b is an integer of 11 to 19) or —$CH_2CH(OH)CH_2$—$C_dF_{2d+1}$ (d is an integer of 2 to 6),

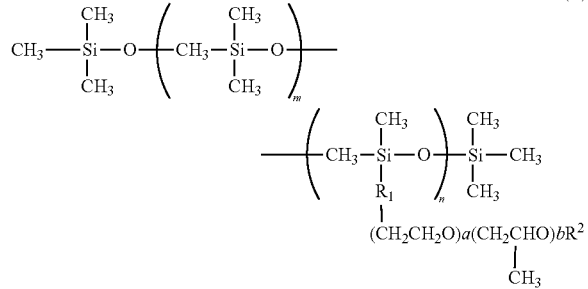

General Formula (II)

where $R^1$ is a C1-C10 alkylene group; $R^2$ is hydrogen or a C1-C5 alkyl group; m is an integer of 0 to 10; n is an integer of 0 to 40; and a and b are each an integer of 1 to 20,

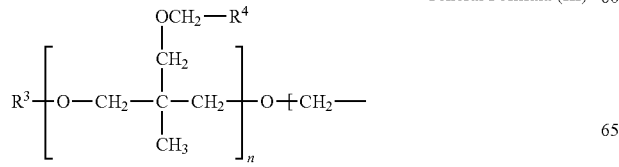

General Formula (III)

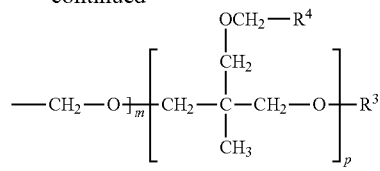

where both $R^3$ may be the same or different, and are each an alkyl group or an acyl group; both $R^4$ may be the same or different, and are each —$CF_3$, or —$CF_2CF_3$; n and p are each an integer of 1 to 4; and m is an integer of 1 to 25.

2. The inkjet recording method according to claim 1, wherein the inkjet recording ink is an ink set containing at least four color inks including a black ink, a cyan ink, a magenta ink, and a yellow ink.

3. The inkjet recording method according to claim 1, wherein an amount of pure water transferred to the recording medium during a contact time of 100 ms as measured by a dynamic scanning absorptometer is 2 mL/m² to 30 mL/m².

4. The inkjet recording method according to claim 1, wherein a contact angle of a droplet of the inkjet recording ink is 16° to 32° in 100 ms after dropping 5 μL of the droplet of the inkjet recording ink onto a surface of the recording medium.

5. An inkjet recording device comprising:
an ink jetting unit configured to apply a stimulus to an inkjet recording ink to jet the inkjet recording ink, to thereby form an image on a recording medium,
wherein the inkjet recording ink comprises water, a water-soluble organic solvent, a colorant, and a surfactant, and satisfies conditions (1) to (4):
(1) dynamic surface tension ($D_1$) of the inkjet recording ink is 30.0 mN/m to 60.0 mN/m with a surface life time of 15 ms or longer but shorter than 100 ms, as measured by a maximum bubble pressure method,
(2) dynamic surface tension ($D_2$) of the inkjet recording ink is 27.0 mN/m to 35.0 mN/m with a surface life time of 100 ms to 3,000 ms, as measured by a maximum bubble pressure method,
(3) $D_1 \geq D_2$, and
(4) static surface tension of the inkjet recording ink is 27.0 mN/m or less,
wherein the recording medium contains a support, and a recording layer provided at least one surface of the support, where the recording layer contains a cationic resin in an amount of 1.0 g/m² to 2.0 g/m², and the recording medium is a medium for a concealing postcard where the recording medium is folded to bond a surface of the recording layer to face each other with an adhesive after information is recorded on the surface of the recording layer, in which the surface of the recording layer has a 10-sec Cobb size degree of 10 g/m² to 30 g/m² in accordance with JIS P8140, and
wherein the surfactant is a surfactant represented by the following general formula (I), a surfactant represented by the following general formula (II), a surfactant represented by the following general formula (III), or any combination thereof:

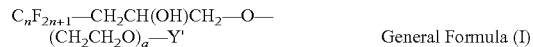

General Formula (I)

where n is an integer of 2 to 6; a is an integer of 15 to 50; Y' is —$C_bH_{2b+1}$ (b is an integer of 11 to 19) or —$CH_2CH(OH)CH_2$—$C_dF_{2d+1}$ (d is an integer of 2 to 6), General Formula (II)

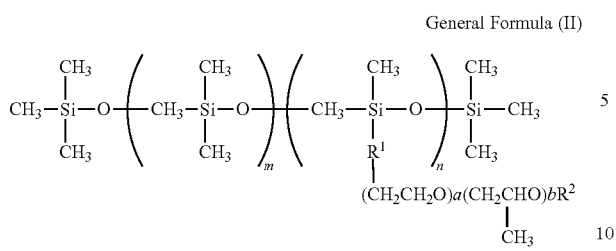

where $R^1$ is a C1-C10 alkylene group; $R^2$ is hydrogen or a C1-C5 alkyl group; m is an integer of 0 to 10; n is an integer of 0 to 40; and a and b are each an integer of 1 to 20,

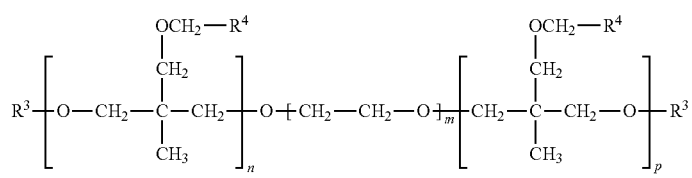

where both $R^3$ may be the same or different, and are each an alkyl group or an acyl group; both $R^4$ may be the same or different, and are each $-CF_3$, or $-CF_2CF_3$; n and p are each an integer of 1 to 4; and m is an integer of 1 to 25.

6. The inkjet recording device according to claim 5, wherein the stimulus is heat, pressure, vibration, light, or any combination thereof.

7. An ink recorded matter comprising:
a recording medium; and
an image formed on the recording medium by an inkjet recording method with an inkjet recording ink,
wherein the inkjet recording ink comprises water, a water-soluble organic solvent, a colorant, and a surfactant, and satisfies conditions (1) to (4):
(1) dynamic surface tension ($D_1$) of the inkjet recording ink is 30.0 mN/m to 60.0 mN/m with a surface life time of 15 ms or longer but shorter than 100 ms, as measured by a maximum bubble pressure method,
(2) dynamic surface tension ($D_2$) of the inkjet recording ink is 27.0 mN/m to 35.0 mN/m with a surface life time of 100 ms to 3,000 ms, as measured by a maximum bubble pressure method,
(3) $D_1 \geq D_2$, and
(4) static surface tension of the inkjet recording ink is 27.0 mN/m or less,
wherein the recording medium contains a support, and a recording layer provided at least one surface of the support, where the recording layer contains a cationic resin in an amount of 1.0 g/m² to 2.0 g/m², and the recording medium is a medium for a concealing postcard where the recording medium is folded to bond a surface of the recording layer to face each other with an adhesive after information is recorded on the surface of the recording layer, in which the surface of the recording layer has a 10-sec Cobb size degree of 10 g/m² to 30 g/m² in accordance with JIS P8140, and wherein the surfactant is a surfactant represented by the following general formula (I), a surfactant represented by the following general formula (II), a surfactant represented by the following general formula (III), or any combination thereof:

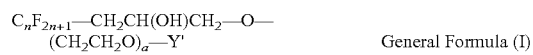
General Formula (I)

General Formula (III)

where n is an integer of 2 to 6; a is an integer of 15 to 50; Y' is $-C_bH_{2b+1}$ (b is an integer of 11 to 19) or $-CH_2CH(OH)CH_2-C_dF_{2d+1}$ (d is an integer of 2 to 6), General Formula (II)

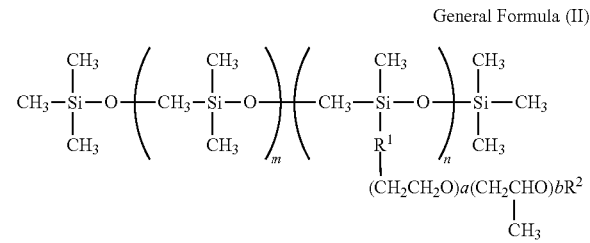

where $R^1$ is a C1-C10 alkylene group; $R^2$ is hydrogen or a C1-C5 alkyl group; m is an integer of 0 to 10; n is an integer of 0 to 40; and a and b are each an integer of 1 to 20, General Formula (III)

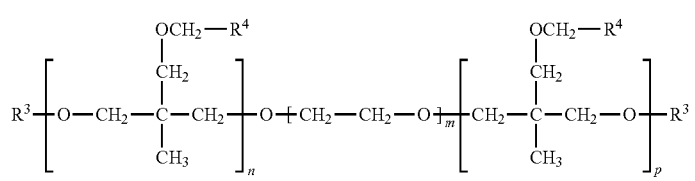

where both $R^3$ may be the same or different, and are each an alkyl group or an acyl group; both $R^4$ may be the same or different, and are each —CF$_3$, or —CF$_2$CF$_3$; n and p are each an integer of 1 to 4; and m is an integer of 1 to 25.

\* \* \* \* \*